United States Patent [19]

Yamauchi et al.

[11] Patent Number: 5,099,815
[45] Date of Patent: * Mar. 31, 1992

[54] FUEL INJECTION VALVE AND FUEL SUPPLY SYSTEM EQUIPPED THEREWITH FOR INTERNAL COMBUSTION ENGINES

[75] Inventors: Teruo Yamauchi; Toshiharu Nogi; Yoshishige Ohyama, all of Katsuta, Japan

[73] Assignee: Hitachi, Ltd., Tokyo, Japan

[ * ] Notice: The portion of the term of this patent subsequent to Jun. 25, 2008 has been disclaimed.

[21] Appl. No.: 618,472

[22] Filed: Nov. 27, 1990

[30] Foreign Application Priority Data

Aug. 24, 1987 [JP] Japan .............................. 62-208312
Aug. 28, 1987 [JP] Japan .............................. 62-212706
Oct. 30, 1987 [JP] Japan .............................. 62-273289

[51] Int. Cl.$^5$ ...................... F02M 51/08; B05B 17/06
[52] U.S. Cl. .................................. 123/472; 123/490; 239/102.2; 310/325
[58] Field of Search ............... 123/472, 478, 490, 538, 123/494, 590; 239/102.2; 310/316, 325

[56] References Cited

U.S. PATENT DOCUMENTS

| | | | |
|---|---|---|---|
| 3,884,417 | 5/1975 | Sheffield et al. | 239/102.2 |
| 4,000,852 | 1/1977 | Martin | 239/102.2 |
| 4,301,968 | 11/1981 | Berger et al. | 310/325 X |
| 4,307,838 | 12/1981 | Martin | 239/102.2 |
| 4,319,155 | 3/1982 | Nakai et al. | 239/102.2 X |
| 4,337,896 | 7/1982 | Berger et al. | 239/102.2 |
| 4,389,999 | 6/1983 | Jaqua | 123/536 |
| 4,418,672 | 12/1983 | Muller et al. | 239/102.2 X |
| 4,469,974 | 9/1984 | Speranza | 123/494 X |
| 4,541,564 | 9/1985 | Berger et al. | 239/102.2 |
| 4,756,478 | 7/1988 | Endo et al. | 239/102.2 |

FOREIGN PATENT DOCUMENTS 3036721 4/1982 Fed. Rep. of Germany ... 239/102.2
94713 5/1987 Japan ................. 239/102.2

Primary Examiner—Tony M. Argenbright
Attorney, Agent, or Firm—Antonelli, Terry Stout & Kraus

[57] ABSTRACT

A fuel injection valve for internal combustion engines is disclosed, in which a transducer is vibrated by an electrostrictive device, and the fuel is atomized by a vibration surface at the part of the transducer where the amplitude thereof is maximum. The transducer has a path for transporting the fuel to the vibration surface. The fuel transport path may have midway thereof a valve member with a valve seat adapted to rise for opening the transport path when a predetermined vibration is exerted on the transducer.

15 Claims, 25 Drawing Sheets

F I G. 34 A 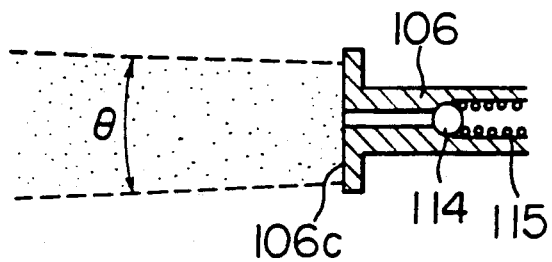
F I G. 34 B 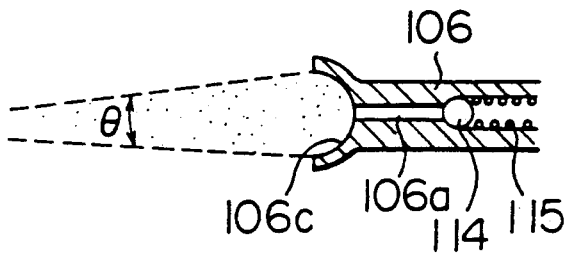
F I G. 34C 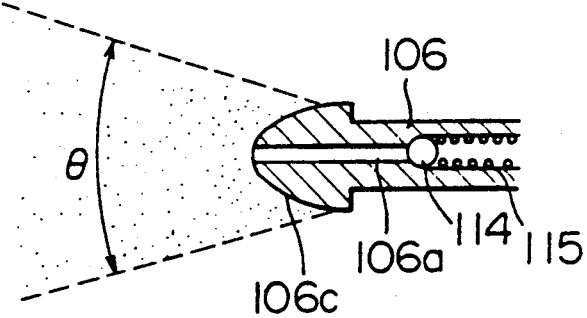
F I G. 34D 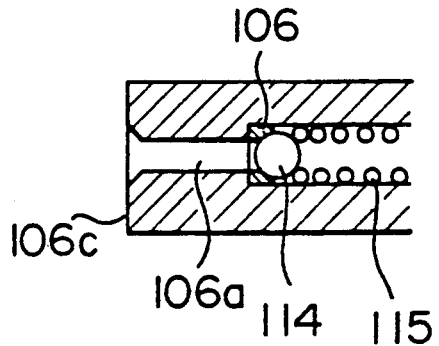

FUEL INJECTION VALVE AND FUEL SUPPLY SYSTEM EQUIPPED THEREWITH FOR INTERNAL COMBUSTION ENGINES

This application is a continuation of application Ser. No. 233,038, filed Aug. 17, 1988, now U.S. Pat. No. 5,025,766.

BACKGROUND OF THE INVENTION

The present invention relates to a fuel supply system suitable for supplying the fuel to an internal combustion engine, or more in particular to a fuel supply system having the functions of metering and atomizing the fuel.

In the conventional field of internal combustion engines for automobiles, for example, the fuel is supplied by way of an injection valve of magnetic coil type. In a fuel supply system of this type, as well known, a valve held by a spring under the electromagnetic force generated in a coil is pulled up to meter the fuel while injecting the same. The conventional injection valve of magnetic coil type injects the fuel with a particle size of approximately 300 μm. The fuel of this particle size partially fails to ride the gas stream in the intake air system and attaches onto the wall of the intake manifold without being transported. The fuel thus deposited flows into the cylinder in the form of a liquid film with the occasional result that the air-fuel ratio deviates from a target value.

In conventionally-suggested means of atomizing the fuel, a fuel injection valve of magnetic coil type is combined with a vibrator for providing an ultrasonic vibration to cause the injected fuel to bombard or contact a vibrating member, thereby promoting the atomization thereof. Such a fuel supply system which operates to atomize the fuel by using a vibrating member is disclosed, for example, in JP-A-53-140417 and JP-A-54-47926.

As described above, in the prior art, the fuel is metered and atomized by a combination of a fuel injection valve of magnetic coil type and a vibrating member. Such a fuel supply system, however, is characterized by an increased number of parts, which makes the system bulky. Another problem of the fuel injection valve of magnetic coil type is the long time required before the plunger attraction and the pull-up operation of the valve body are effected following the energization of the magnetic coil. Especially when the engine is running at high speed with injection signals produced at intervals of several milliseconds, the valve is liable to open at delayed timings resulting in a reduced amount of fuel supply. In order to obviate this problem, a higher response speed is demanded.

In response to this demand, U.S. Pat. No. 2855244, JP-A-52-25926 and JP-A-54-10951 proposes a fuel supply system in which the fuel is led to an injection port formed at the forward end of a vibration-amplifying horn excited by a piezoelectric device through a fuel passage formed in the horn, and the fuel is supplied therefrom in atomized form into the intake manifold.

These systems have a ball valve mounted at the horn injection port thereof and operate to apply a pulse drive signal of a frequency equal to the resonant frequency of the horn to the horndriving piezoelectric device thereby to open the injection port for fuel injection.

The aforementioned prior-art systems thus control the fuel flow rate of a fuel supply system by changing the frequency of a pulse drive signal applied to a piezoelectric device for driving a horn.

These prior-art fuel supply systems, however, have a disadvantage that the quantitatively meterable range of the flow rate of the fuel injected in resonance with the horn is comparatively narrow. Specifically, when the engine speed exceeds 2,000 to 3,000 r.p.m., an excessive fuel rate makes it impossible for the system to atomize the fuel any more.

Further, in view of the fact that the horn is resonated only during the fuel injection time, the fuel injected immediately before the ball valve closes fails to be atomized and is liable to contain coarse fuel particles.

SUMMARY OF THE INVENTION

The present invention has been conceived in view of the above-mentioned problems and disadvantages inherent in prior fuel supply systems of this type, and the object thereof is to provide a fuel supply system in which the meterable range of fuel flow rate is enlarged on the one hand and the atomization function of the fuel is improved on the other.

In order to achieve the above-mentioned object, according to the present invention, there is provided a fuel supply system comprising an electrostrictive device for generating a mechanical vibration by applying an electrical vibration of a set frequency and a horn including an internal fuel path and a vibration-increasing surface for enlarging the mechanical vibration at the outlet of the fuel path, the electrostrictive device and the horn being assembled integrally to make up a body of the fuel supply system. In this arrangement, a spring is disposed in a part of the fuel path, and a valve forming a fuel metering system is placed in pressure contact with a valve seat by the force of the spring, the spring having such a characteristic as to be excited through a vibration transmission system of the horn thereby to generate a contraction force when the mechanical vibration exceeds a predetermined amplitude level. The system further comprises means for metering the fuel with the valve separated from the valve seat in accordance with the spring contraction force, and means for guiding the fuel injected from the outlet of the fuel, path to the vibration-increasing surface after metering, the injected fuel being atomized at the vibration-increasing surface.

According to this configuration, when a mechanical vibration (ultrasonic vibration) of an electrostrictive device is generated by application of an electrical oscillation thereto and this mechanical vibration is transmitted to a spring through a vibration transmission system, such as a horn or a vibration-increasing surface, the spring is excited into a resonant state. When this vibration level exceeds a predetermined amplitude, a spring contraction occurs. This spring contraction, which is understood to be caused as it buckles under excitation, displaces the valve body and is subjected to a force separating it from the valve seat. At the same time, the force is exerted on the pressurized fuel in the fuel path to cause it to make its way into the area between the valve and the valve seat. These working forces combine to raise the valve body away from the valve seat. The fuel flows out through a circular path between the valve body and the valve seat while being metered and is thus injected by way of the fuel path outlet. This fuel is guided toward and comes into contact with the vibration-increasing surface, and is thus atomized under ultrasonic vibrations.

According to this system, the metering and atomization of the fuel which have thus far been conducted as independent functions respectively can be carried out with a single device. Further, the fact that the valve body can be raised instantaneously by the excitation of the electrostrictive device quickens the response speed.

Furthermore, the fuel, after being metered, is guided to the vibration surface of the vibration-increasing means and is thus positively atomized, thus leading to a sufficient atomization performance over a wide operation range of the engine with a high atomization ability.

According to another aspect of the present invention, there is provided a fuel supply system mounted on an internal combustion engine, comprising a horn mounted on the intake manifold and driven and displaced by a piezoelectric device, a fuel supply path formed in the horn and having an injection port at the end of the intake manifold, a valve disposed at the injection port, and drive signal supply means for supplying the piezoelectric device with a first pulse drive signal of a first amplitude with a frequency equal to the resonant frequency of the horn and a second pulse drive signal of a frequency lower than the resonant frequency of the horn and having a second amplitude larger than the first amplitude.

According to this invention, a piezoelectric device for driving the horn mounted on the intake manifold is supplied with a first pulse drive signal and a second pulse drive signal of different amplitudes generated in synchronism with the resonant frequency of the horn.

As a result, the injection port at the end of the horn in the intake manifold is closed by the valve and therefore the fuel is not injected when the first pulse drive signal of a small amplitude is applied thereto although the horn is under constant vibration at the resonant frequency.

The second pulse drive signal having a frequency lower than the resonant frequency of the horn and a second amplitude larger than the first amplitude of the first pulse drive signal is inserted into the first pulse drive signal at a predetermined interval by the drive signal supply means.

As a consequence, when the second pulse drive signal is applied to the piezoelectric device, the horn vibration increases and the valve is separated from the injection port, with the result that the injection port opens to inject the fuel.

As explained above, the horn is kept under vibration at the resonant frequency by the piezoelectric device, and therefore the fuel is always supplied in an atomized state.

Also, the fuel flow rate is controlled by the pulse duration of the second pulse drive signal.

BRIEF DESCRIPTION OF THE DRAWINGS

FIGS. 34A to 34D are diagrams showing the relationship between the style of the vibration surface at the forward end of the horn of the injection valve and the atomization angle.

DESCRIPTION OF THE PREFERRED EMBODIMENTS

Figure 1:
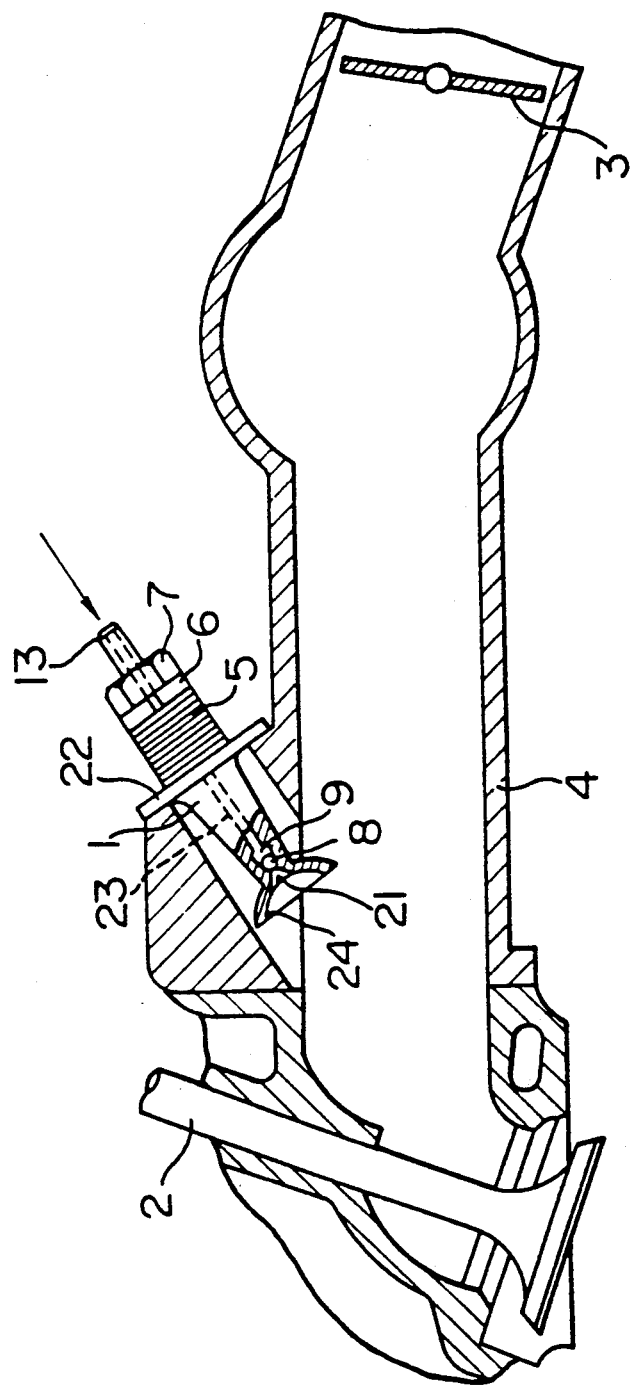
FIG. 1 is a sectional view showing a system according to an embodiment of the present invention as mounted on the intake manifold.

As shown in FIG. 1, according to an embodiment of the present invention, a horn 1 is mounted on the intake valve side of an intake manifold 4 of an internal combustion engine.

This horn 1 having an injection port 21 at the end thereof located within the intake manifold 4 is mounted on the pipe wall of the intake manifold 4 by a flange 22.

The plate surface of the flange 22 is kept in contact with the end of a multilayer piezoelectric device 5, which in turn is mounted on the horn 1 by a bolt 13 and a nut 7 through a ring 6.

Also, the horn 1 has a fuel supply path 23 formed therein, and an end of the fuel supply path 23 is formed with the injection port 21.

Figure 2A:
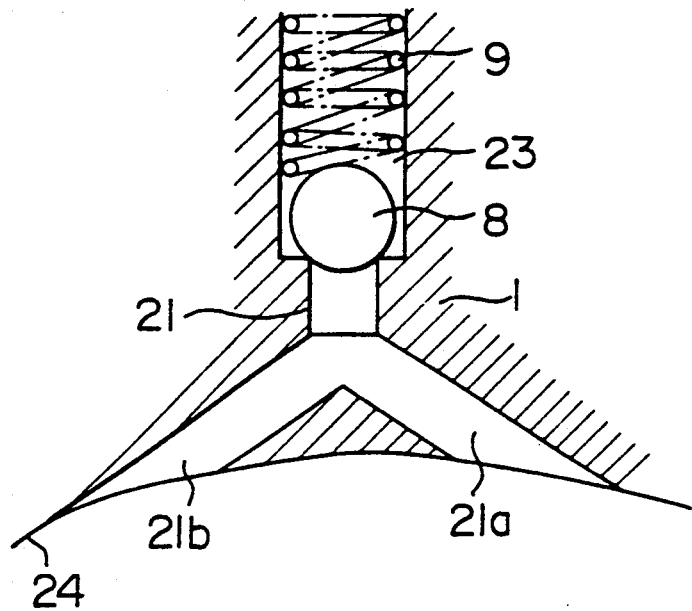
FIGS. 2A and 2B are sectional views respectively showing a construction of a valve in operation according to an embodiment of the present invention.

This injection port 21 is formed with an inner diameter smaller than that of the fuel supply path 23. The injection port 21 is fitted with a ball made of a wear-resistant ceramic material located within the fuel supply path 23. The ball 8 is thus biased toward the injection port 21 by the spring 9 thereby to form a valve unit as shown in FIG. 2(a).

Further, the end of the horn 1 adjacent the injection port 21 is formed with a conical vibration surface 24.

Figure 3:
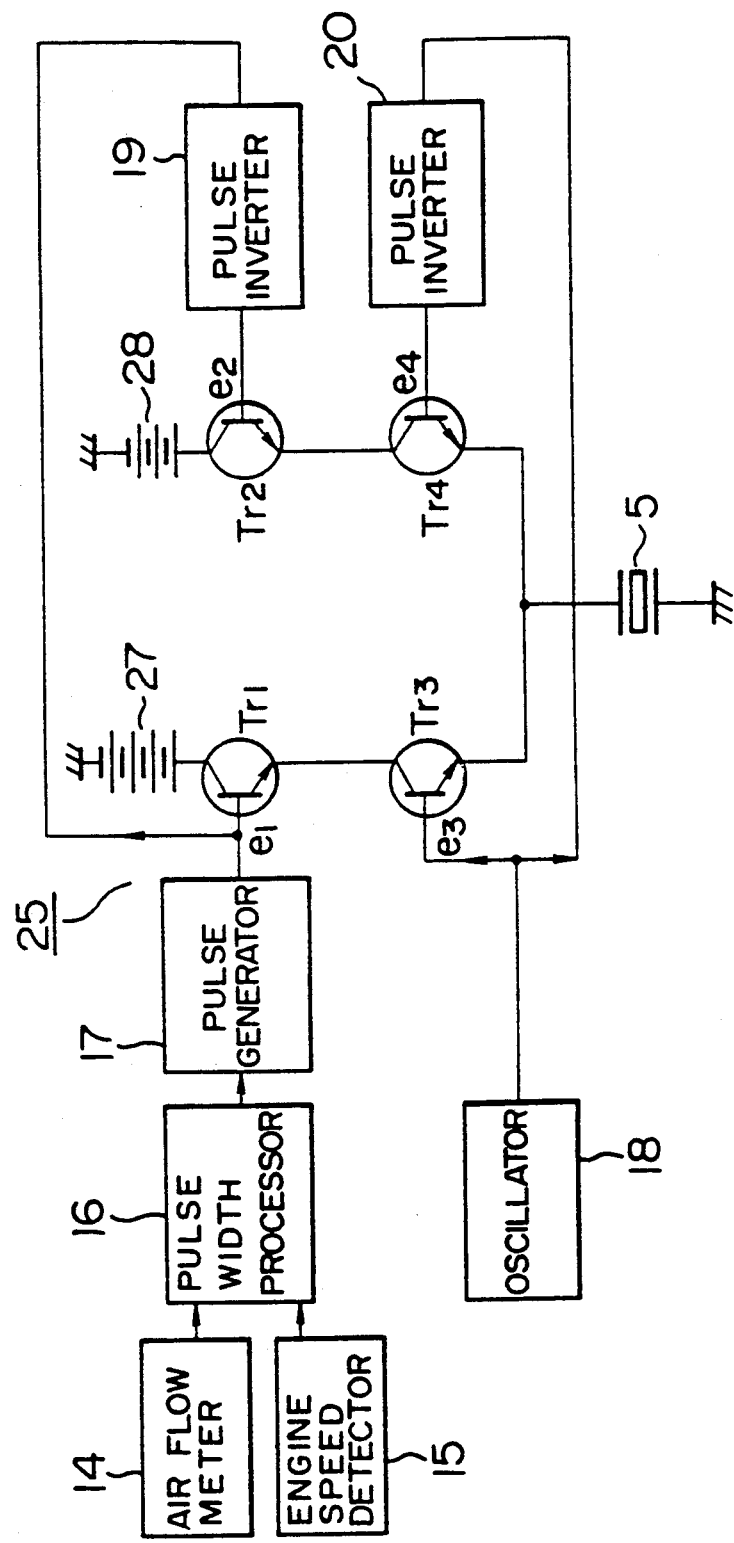
FIG. 3 is a circuit diagram showing a configuration of drive signal supply means according to an embodiment of the present invention.

The piezoelectric device 5 is connected with a drive signal supply 25 as shown in FIG. 3. A pulse drive signal supplied by this drive signal supply 25 causes repeated displacement of the piezoelectric device 5 along the axial direction, thus vibrating the horn 1.

Specifically, as shown in FIG. 3, output terminals of an air amount detector 14, such as an air flow rate meter or an intake manifold pressure sensor disposed in the air intake path, and an engine speed detector 15, including a crank angle sensor, are connected to an input terminal of a pulse duration processor 16, an output of which is in turn connected to an input terminal of a pulse generator 17.

An output terminal of this pulse generator 17 is connected to the base of a transistor $Tr_1$, the collector of which is supplied with a voltage from a battery 27.

The emitter of the transistor $Tr_1$, on the other hand, is connected to the collector of a transistor $Tr_3$, the base of which is connected to an output terminal of an oscillator 18.

The emitter of the transistor $Tr_3$ is connected to an electrode of the piezoelectric device 5, the other electrode of which is grounded.

An output terminal of the pulse generator 17 is connected to an input terminal of a pulse inverter 19, an output terminal of which is connected to the base of the transistor $Tr_2$, and the collector of which is supplied with a voltage from a battery 28.

An output terminal of the oscillator 18, on the other hand, is connected to an input terminal of the pulse inverter 20 and an output of this pulse inverter 20 is connected to the base of the transistor $Tr_4$.

The collector of the transistor $Tr_4$ is connected to the emitter of the transistor $Tr_2$ described above. The emitter of the transistor $Tr_4$ is connected to one of the electrodes of the piezoelectric device 5.

In an embodiment of the present invention having this configuration, the spring 9 and the ball 8 make up a valve unit, and drive signal supply is made up of the air amount detector 14, the engine speed detector 15, the pulse duration processing means 16, the pulse generator 17, the oscillator 18, the batteries 27, 28, the transistors $Tr_1$, $Tr_2$, $Tr_3$, $Tr_4$ and the pulse inverters 19, 20.

The operation of the embodiment of the present invention configured as explained above will be described below.

Figure 4:
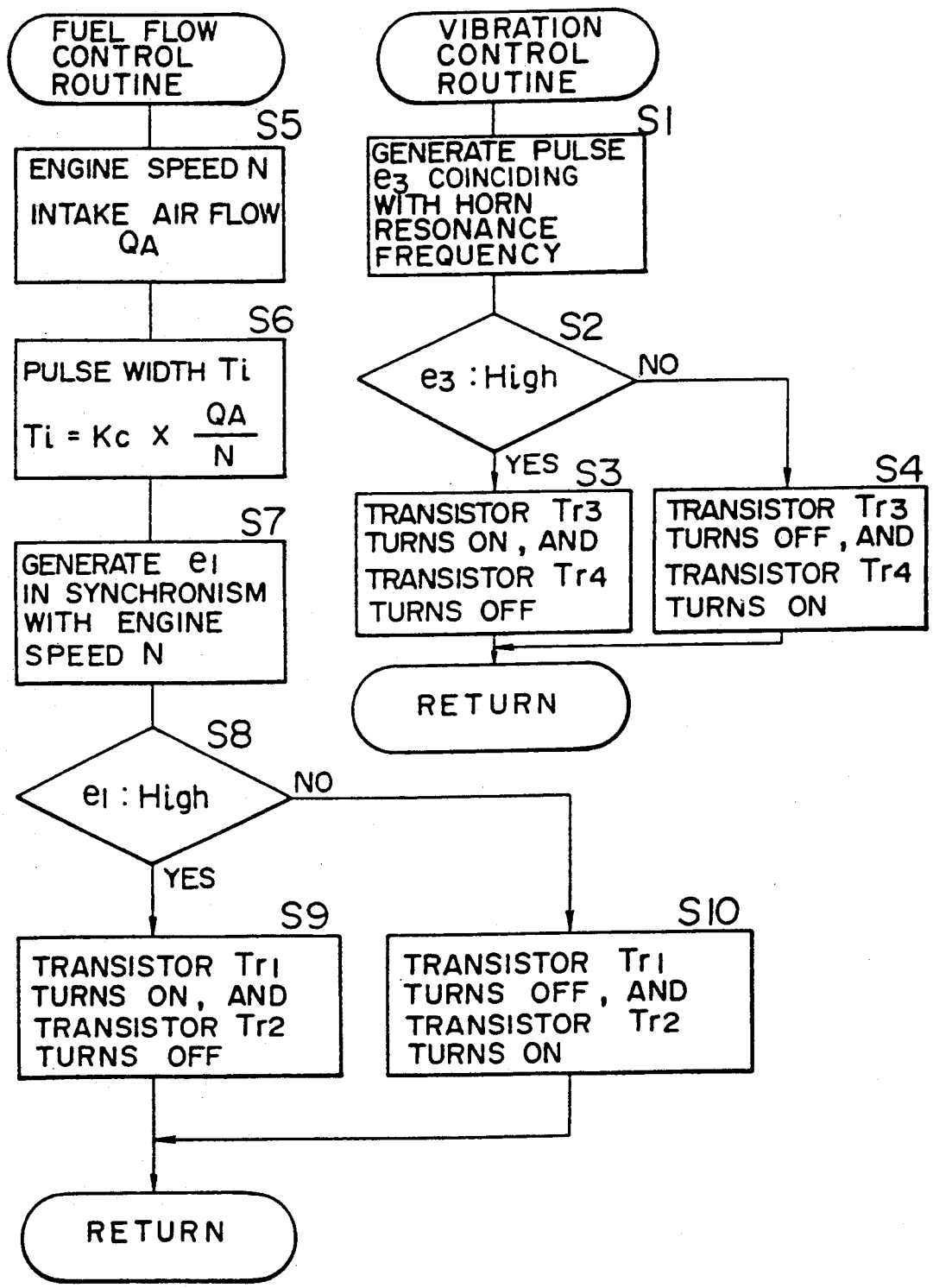
FIG. 4 is a flowchart showing the operation of an embodiment of the present invention.
Figure 8:
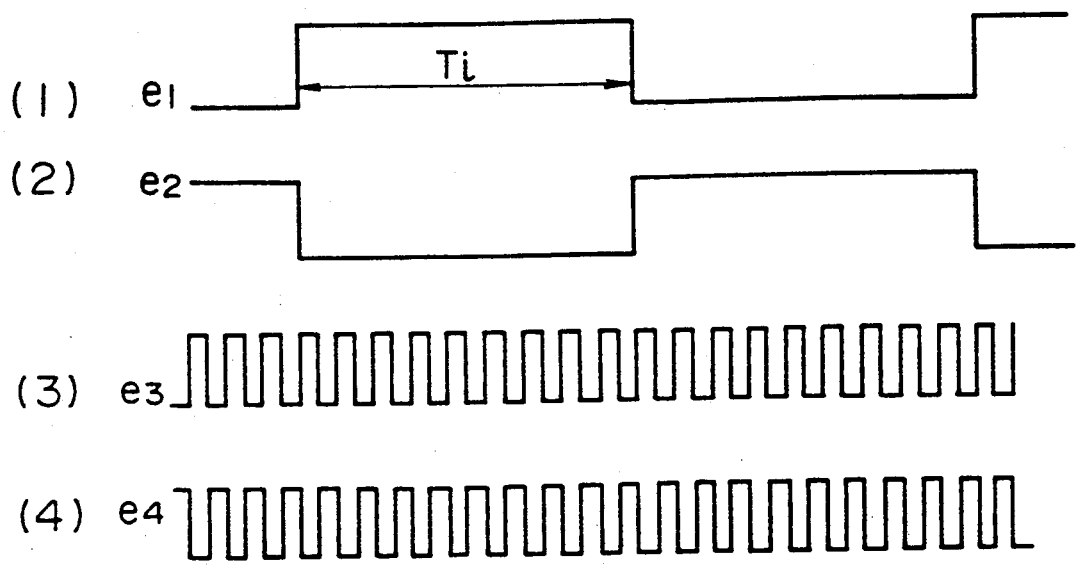
FIGS. 8(1-4) and FIGS. 9(1-3) are diagrams showing signal waveforms at various parts of the drive signal supply means according to an embodiment of the present invention.

In FIG. 4, step S1 transmits a pulse signal $e_3$ of 33 KHz in frequency, for example, which is equal to the resonant frequency of the horn as shown in FIG. 8(3), which pulse signal is applied to the base of the transistor $Tr_3$.

At the same time, an inverted pulse signal $e_4$ as shown in FIG. 8(4) inverted at the pulse inverter 20 is applied to the base of the transistor $Tr_4$.

If step S2 in FIG. 4 decides that the pulse signal $e_3$ is "H", the process proceeds to step S3 where the transistor $Tr_3$ is turned on and the transistor $Tr_4$ off.

In the case where step S2 decides that the pulse signal $e_3$ is "L", by constrast, the process proceeds to step S4 for turning off the transistor $Tr_3$ and turning on the transistor $Tr_4$.

In the vibration control routine shown in FIG. 4, the operation mentioned above is repeatedly performed.

Next, in the step S5 of FIG. 4, the intake air flow is detected by the air flow detector 14 and the engine speed by the engine speed detector 15. Respective signals are applied to the pulse duration processor 16. In this pulse duration processor 16, the pulse duration Ti is calculated at step S6 on the basis of the detection signals mentioned above from the equation shown below.

$$Ti = Kc \times \frac{Q_A}{N} \qquad (1)$$

where Kc is a constant, $Q_A$ is intake air flow and N is engine speed.

On the basis of the result of the calculation performed by the pulse duration processor 16 in this way, the pulse generator 17 applies a pulse signal with the pulse duration of Ti shown in FIG. 8(1) to the base of the transistor $Tr_1$ in synchronism with the engine speed N.

If step S8 decides that the pulse signal $e_1$ is "H", the process proceeds to step S9, where the transistor $Tr_1$ is turned on and the transistor $Tr_2$ off.

In the event that the step S8 decides that the pulse $e_1$ is "L", by contrast, the process is passed to step S10 for turning off the transistor $Tr_1$ and turning on the transistor $Tr_2$.

The fuel flow control routine of FIG. 4 performs this operation repeatedly.

Figure 5:
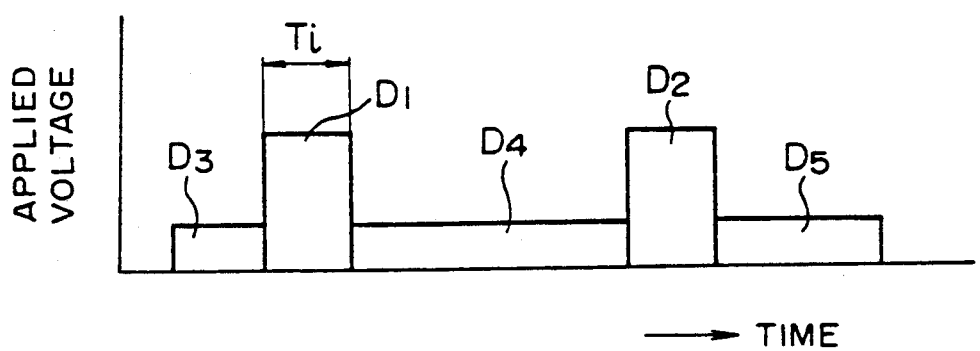
FIG. 5 is a diagram showing a pulse drive signal divided according to an embodiment of the present invention.

As a result, during the section designated by $D_1$ and $D_2$ in FIG. 5 where the pulse signal $e_1$ is "H", the signal from the battery 27 is applied through the transistor $Tr_1$ to the collector of the transistor $Tr_3$ during the time period set by the pulse duration Ti.

Figure 9:
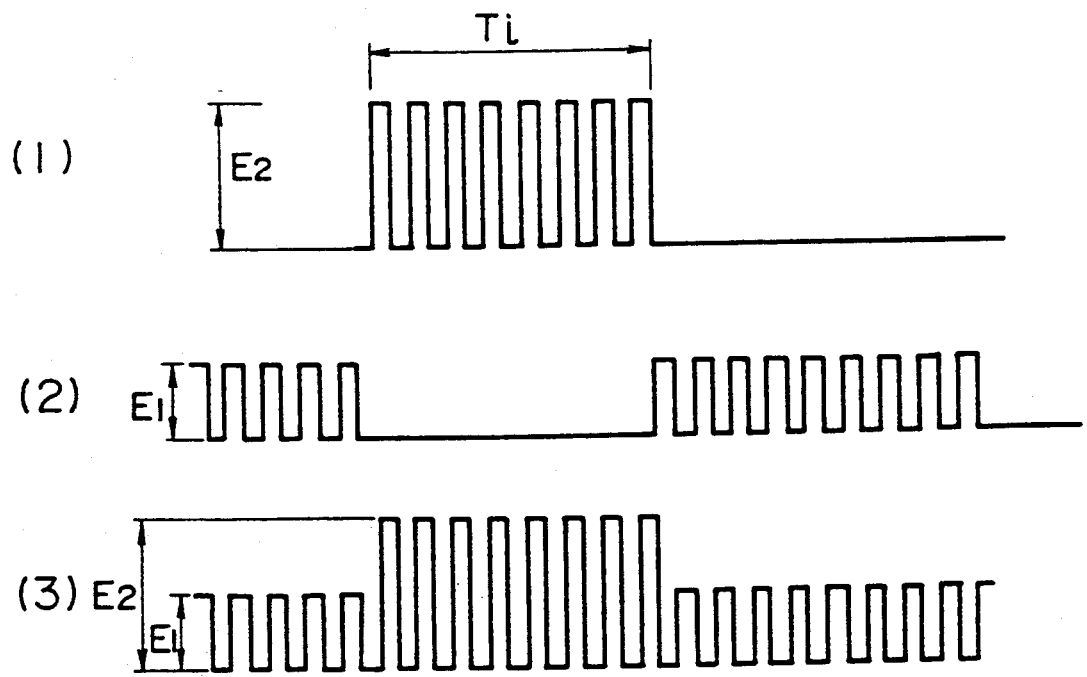

A second pulse drive signal with an amplitude $E_2$ shown in FIG. 9(1) appears at the emitter of the transistor $Tr_3$ in correspondence with the "H" state of the pulse signal $e_3$ and this signal is applied to the piezoelectric device 5.

Also, during the section designated by $D_3$, $D_4$ and $D_5$ in FIG. 5 when the pulse signal $e_1$ is "L", on the other hand, the signal from the battery 28 is kept applied to the collector of the transistor $Tr_4$ through the transistor $Tr_2$ as long as the pulse signal $e_3$ is "H".

As a result, the first pulse drive signal having an amplitude $E_1$ corresponding to the "H" state of the pulse signal $e_4$ appears at the emitter of the transistor $Tr_4$ and is applied to the piezoelectric device 5.

Figure 6:
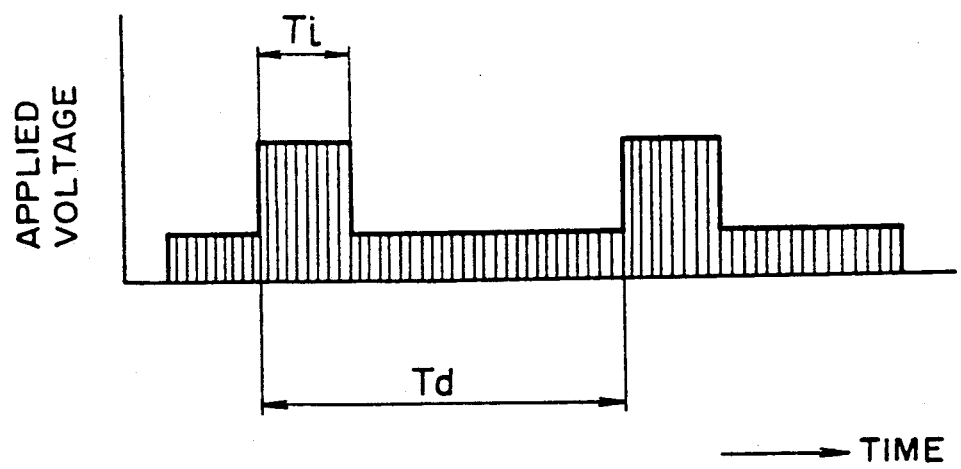
FIG. 6 is a waveform diagram showing a first pulse drive signal and a second pulse drive signal inserted thereinto according to an embodiment of the present invention.

In this manner, the piezoelectric device 5 is supplied with the pulse drive signals shown in FIG. 6 and FIG. 9(3).

The frequency of the above-mentioned pulse drive signals is constant and coincides with the resonant frequency of the horn over the whole region, so that the horn 1 is always vibrated at its resonant frequency.

In the section where the first pulse drive signal is applied, that is, in the sections defined by $D_3$, $D_4$ and $D_5$ in FIG. 5, however, the amplitude of the first pulse drive signal is so small that, as shown in FIG. 2(a), the ball 8 keeps the injection port 21 closed by the bias force of the spring 9, and no fuel is supplied from the fuel supply system.

Figure 2B:
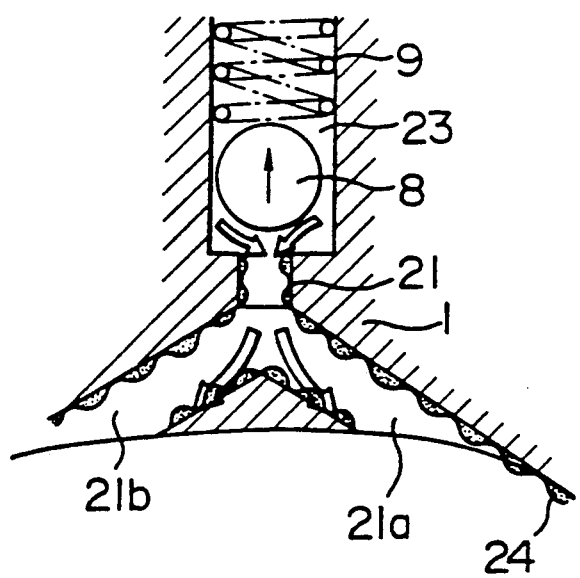

During the sections where the second pulse drive signal is applied, that is, during the sections $D_1$ and $D_2$ in FIG. 5, where the second pulse drive signal has a large amplitude, the vibration of the horn 1 at the resonant frequency causes the ball 8 to move against the bias of the spring 9, so that the injection port 21 opens to inject the fuel by way of the injection port 21 in the manner shown in FIG. 2(b).

The fuel injected from the injection port 21 through the fuel supply path 23 formed in the horn 1 is atomized by vibration at the resonant frequency of the horn 1. Especially, it is atomized efficiently by the conical vibration surface 24 formed on the peripheral parts of the injection port 21.

In this way, a sufficiently-atomized fuel quantity injected from the injection port 21 is mixed with the air sucked from the intake valve 2 shown in FIG. 1, and is supplied into the internal combustion engine through the throttle valve 3.

In the process, if the horn 1 is arranged so as to be directed toward the intake valve 2 so that the fuel injected from the injection port 21 may cover the whole surface of the intake valve 2 uniformly, the evaporation of the fuel at the intake valve is promoted and a mixture gas of uniform nature is supplied to the internal combustion engine.

Figure 7:
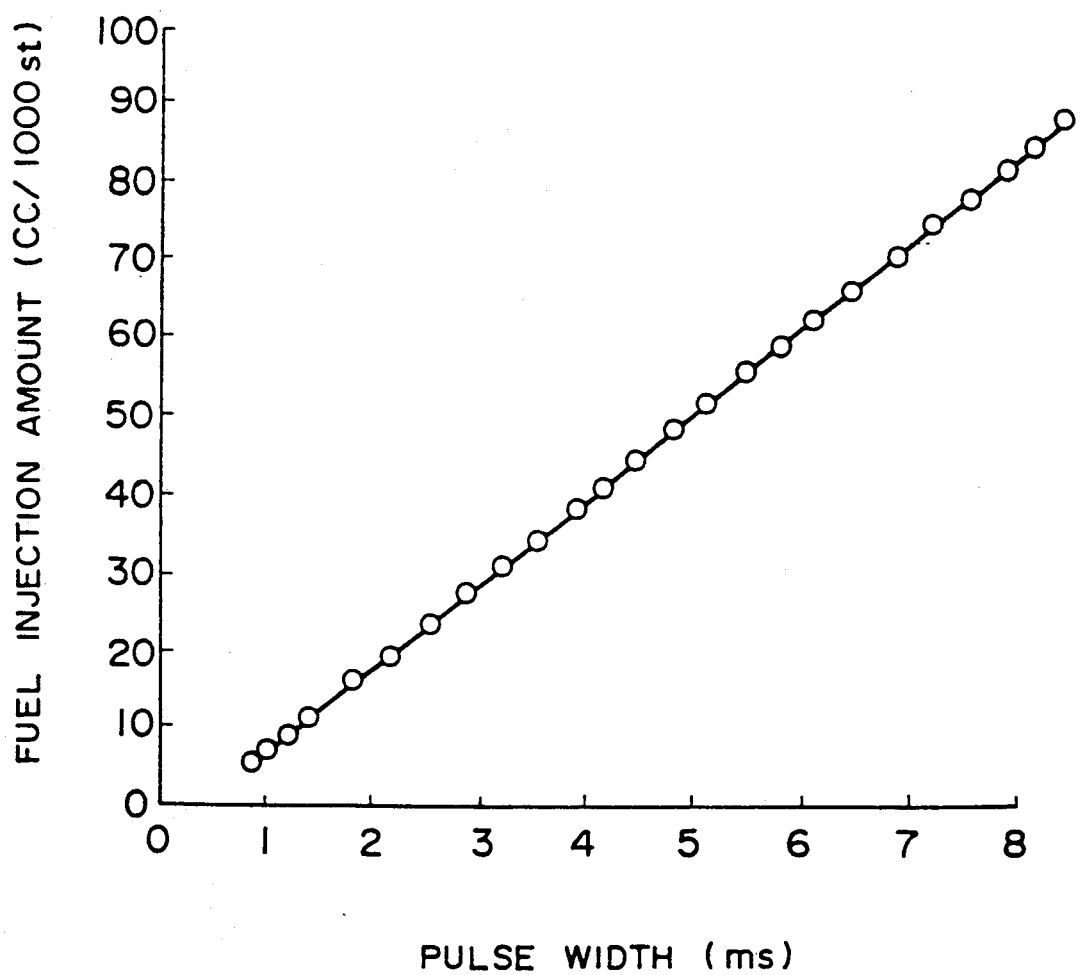
FIG. 7 is a diagram showing the relationship between the fuel injection amount and an injection pulse width according to an embodiment of the present invention.

As shown in FIG. 7, by changing the pulse duration Ti mentioned above, it is possible to meter the amount of fuel injection from the injection port 21 accurately.

Further, by changing the amplitude E2 of the second pulse drive signal, it is possible to select an optimum fuel supply condition for the internal combustion engine by setting a unit injection amount.

Actual measurements by the inventors show that fuel of particle size less than 100 microns can be supplied into the internal combustion engine with high measurement accuracy if the ball 8 has a diameter of 3 mm and the spring 9 has a spring constant of 100 g/mm.

Especially in the view of the fact that the horn 1 is kept in vibration at the resonant frequency, even the fuel injected immediately before the closing or opening of the valve is atomized efficiently at the conical vibration surface 24.

Furthermore, even when the fuel flow rate is high, the fuel is completely atomized by the horn 1 under vibration at the resonant frequency.

As seen from the foregoing description, the air-fuel ratio is held at a constant level and the fuel is efficiently supplied to the internal combustion engine by setting the pulse duration Ti in the manner specified by equation (1) in accordance with the operating conditions of the internal combustion engine.

Figure 10:
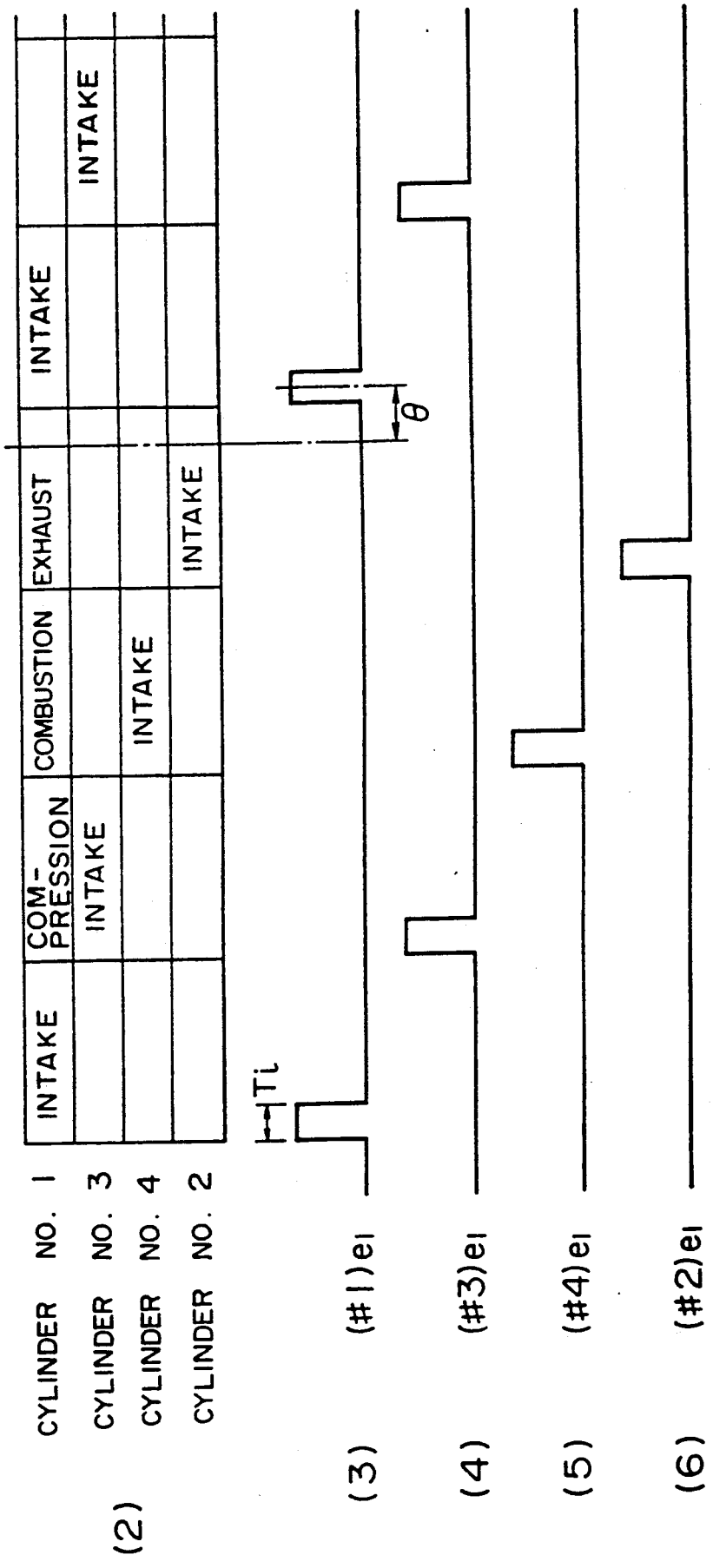
FIGS. 10(1-6) are a signal waveform diagram corresponding to the operation of the cylinders of a four-cylinder engine according to an embodiment of the present invention.

FIG. 10 shows a case in which an embodiment of the present invention is applied to a four-cylinder engine, in which a cylinder discrimination signal shown in (1) is generated by forming slits of different widths in the crank angle sensor.

The first cylinder horn, for instance, is supplied with the pulse signal $e_1$ of the pulse duration Ti mentioned above at a timing delayed by $\theta$ from these cylinder discrimination signals.

As a result, the fuel can be injected in synchronism with the intake stroke of the first cylinder as mentioned above.

The fuel can be injected exactly in the same manner also into the second to fourth cylinders.

An embodiment with the valve unit of the horn nozzel formed of a spring and a ball is explained above. As an alternative, it is also possible to configure the valve unit to include only a ball pressed against the injection port under the pressure of the fuel flow without any spring being provided and with the injection port of the horn directed downward.

According to this embodiment, the range of fuel flow rate capable of measurement control is enlarged on the one hand and the function of fuel atomization is improved on the other, thus providing a fuel supply system capable of supplying an atomized fuel mixture of uniform quality at an optimum injection rate to the internal combustion engine.

Now, a specific construction of a fuel supply system will be explained.

First, description will be made of the construction of a transducer 104 with reference to FIGS. 11 to 15.

Figure 13:
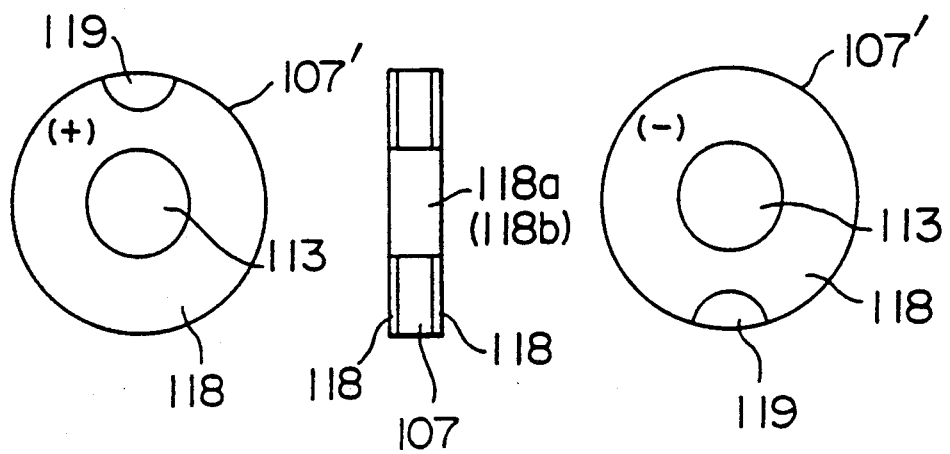
FIG. 13 is a diagram showing an appearance of a specific example of an electrostrictive device used with the first example shown in FIG. 12.
Figure 14:
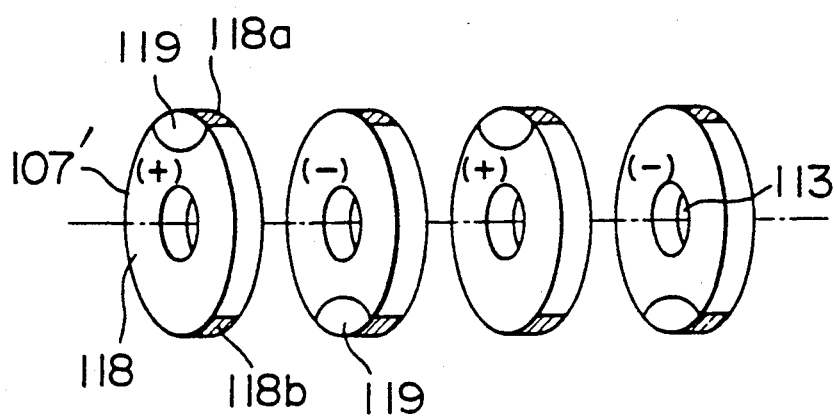
FIG. 14 is an exploded perspective view showing an interlayered condition of the electrostrictive device shown in FIG. 13.
Figure 15:
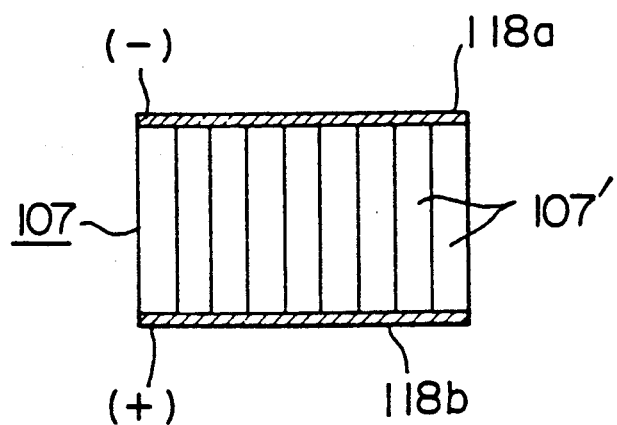
FIG. 15 is a sectional view showing an interlayered condition of the electrostrictive device shown in FIG. 14.

The transducer 104 is of a Langevin type made of a horn 106 and multilayer electrostrictive device 107, and in the embodiment under consideration is used as a fuel injection valve. This fuel injection valve has recently been developed for supplying fuel to an internal combustion engine of an automobile, and the operation thereof will be described later. The multilayer electrostrictive device 107 is secured at an end of the horn 106 by a bolt 116. The multilayer electrostrictive device 107 consists of a number of electrostrictive elements 107' in lamination and has a part thereof built in with voltage application electrodes 110, 111. a monitor electrode 112, a monitor electrostrictive element (amplitude detection means) 105 and the like. The multilayer electrostrictive device 107, as shown in the exploded sectional view of FIG. 12, has the electrostrictive elements 107' overlaid with the electrodes of the same polarity facing each other. FIG. 13 shows the two surfaces and the sides of the respective electrostrictive elements 107'. As shown in FIG. 13, the electrostrictive element 107' presents a disk-like form with a central through hole 113 and silver electrodes 118 coated on the sides thereof. One of the silver electrodes 118 makes up a positive electrode, and the other a negative electrode. These electrodes are provided with notches 119 not processed as a silver electrode. The notches 119 are arranged on the positive and negative electrode sides at positions not facing each other. The sides of each electrostrictive element 107' also have silver electrodes 118a, 118b at positions corresponding to the notches 119. These electrostrictive elements 107' are overlaid one on another as shown in FIG. 14 in such a manner that the positive electrodes, the negative electrodes, the notches on the positive electrodes and the notches on the negative electrodes for face oppositely to each other, respectively. The electrostrictive elements 107' thus layered are overlaid one on another as shown in FIG. 15 with respective silver electrodes 118a, 118b connected in a series. Under this condition, the sides of the notches 119 are connected by a conductive material such as solder, thus making it possible to connect the electrostrictive elements 107' without interference between the positive and negative electrodes with each other. Returning to FIG. 11, a general configuration of the transducer 104 will be explained. A common voltage-application positive electrode 110 is interposed in a part of the multilayer electrostrictive device 107 and a common negative electrode 111 is provided at the other end of the device. The electrodes 110, 111 are constructed of such a material as a phosphor bronze plate. The horn 106, on the other hand, is grounded to the negative electrode.

Monitor electrostrictive elements 105, without being impressed with a voltage, are built in a part of the multilayer electrostrictive device 107. In this example, a couple of monitor electrostrictive elements 105 are provided. Each of these monitor electrostrictive elements 105 has a construction similar to that of the electrostrictive elements 107', and together with the monitor electrode 112, is interposed between the negative electrode 111, a padding 8 and a nut 109. The monitor electrode 112 is interposed between the positive electrodes of the electrostrictive elements 105 facing each other, and an output therefrom is electrically led out through a lead wire 125. The resultant lamination of the multilayer electrostrictive device 107, the monitor electrostrictive elements 105 and the electrodes 110 to 112 is inserted on a bolt 116 on the horn 106 by way of the through hole 113, and is fastened by a nut 109 through the padding 108. The other end of the horn 106 is progressively reduced in diameter with a fuel path passage 106a formed therein. A part of the fuel path 106a has a steel ball valve 114 and a spring 115 (spring constant: about 0.3 to 1 kg/cm) built therein. The ball valve 114 is urged toward a valve seat 106 by the spring 115 in a closed state when the electrostrictive device 107 is de-energized or is operated at a low amplitude. Upon application of an AC voltage to the electrodes 110 and 111, the multilayer electrostrictive device 107 is displaced. This displacement is enlarged by the horn 106, thus developing a comparatively large amplitude displacement at the forward end of the horn 106. Especially when the frequency of the applied voltage is caused to coincide with the resonant frequency of the horn say, 30 KHz, a steady vibration occurs with the mounting flange 104a as a node. As a result of this vibration, the whole transducer begins to resonate. The amplitude involved is a maximum of several tens of microns at the forward end of the horn. With the occurrence of a sufficient amplitude more than predetermined value in the horn 106, the ball valve 114 rises to open the path 6a. The ball valve 114 is understood to rise on the principle that, with a strong vibration at the resonant frequency applied to the spring 115 via the horn 106, the spring 115 buckles, and this buckling effect is considered to be multiplied by the force of the pressurized fuel in the path trying to intrude between the ball valve 114 and the seat 106b. This valve-opening operation causes the pressurized fuel to be injected by way of an end of the horn 106 through the path 106a. In the process, a pressure of about 1 to 3 kg/cm$^2$ is exerted on the fuel, and a voltage of about ±75 volts is applied to each of the electrostrictive elements 107'.

In order to transmit the displacement of the multilayer electrostrictive device 107 effectively to the horn 106, it is necessary for the multilayer electrostrictive device 107 to be arranged in close contact with the horn 106. For this purpose, the horn 106 is fastened with a torque of more than several tens of kg·cm.

Figure 27:
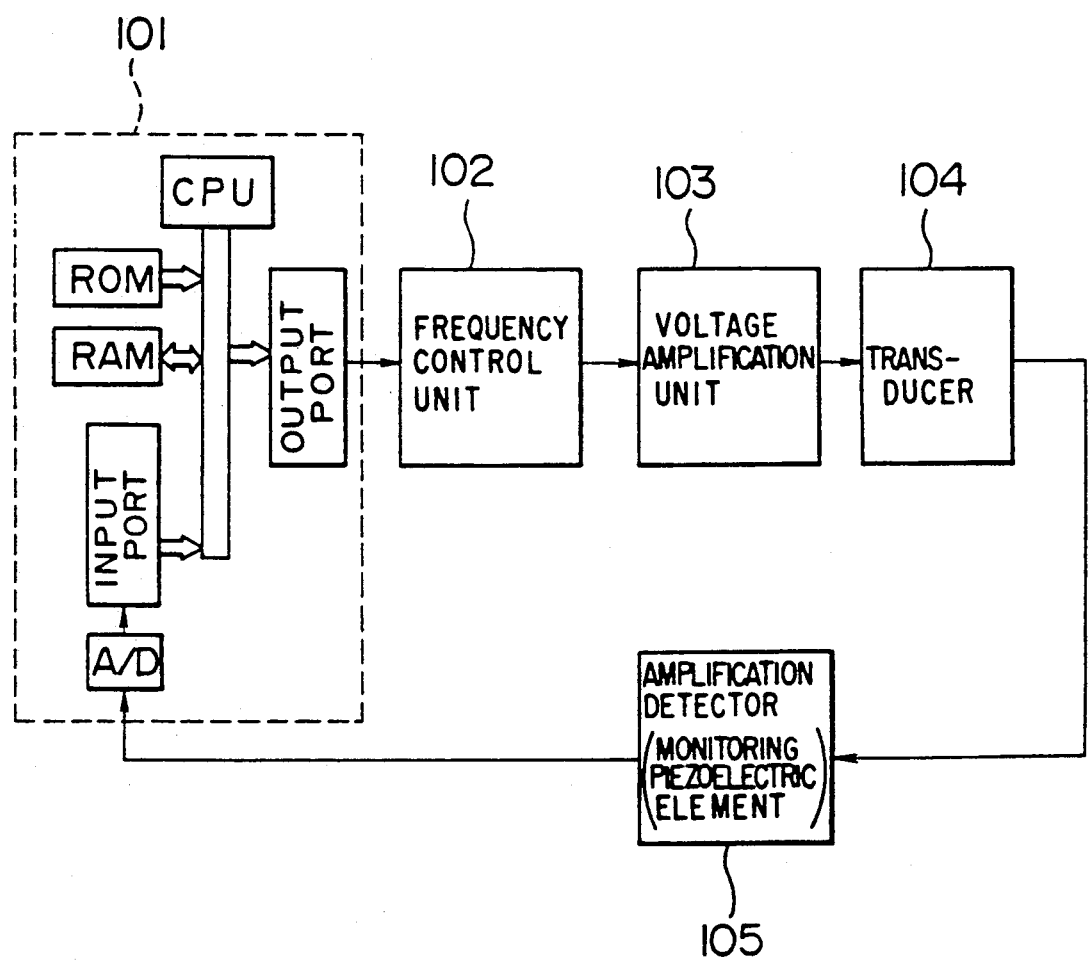
FIG. 27 is a block diagram showing a configuration of a resonant frequency control system using a transducer resonance condition monitor process according to the present invention.

Now, the general operation of the resonant frequency control system using the langevin transducer having the above-mentioned configuration will be explained with reference to FIG. 27.

As described above, upon application of a voltage of a predetermined frequency to the elements 107' of the multilayer electrostrictive device 107, the transducer 104 is excited into a mechanical vibration, which is transmitted to and amplified by the horn 106. It is necessary that the multilayer electrostrictive device 107 and the horn 106 coincide with each other in resonant frequency to set the whole transducer in a resonant state. If the fuel is deposited on the fuel injector, such as part of the horn 106, however, the mass thereof changes the transducer load, with the result that the resonant frequency of the transducer 104 undergoes a change. For this reason, the resonance of the transducer 104 requires constant monitoring, and in the event that the resonant frequency is deviated, the changed resonant frequency must be searched to apply a voltage to the electrostrictive elements 107'.

According to this embodiment, the resonant state of the transducer 104 is monitored by the monitor electrostrictive elements 105 and the microcomputer 101. Specifically, if a mechanical vibration of the transducer 104 is applied to the monitor electrostrictive elements 105, an output voltage proportional to the mechanical vibration of the transducer 104 is produced from the monitor electrostrictive elements 105. A voltage detected from the monitor electrostrictive elements 105 is applied as data to the microcomputer 101. The microcomputer 101 thus monitors whether the transducer 104 is in a resonant state or not, and if the resonant frequency changes, the frequency control means 102 regulates the voltage to be applied to the multilayer electrostrictive device 107 of the transducer to the required resonant frequency.

Now, prior to the operation of the microcomputer 101, the characteristics of the electrostrictive elements will be explained with reference to FIGS. 21 to 26.

Figure 21A:
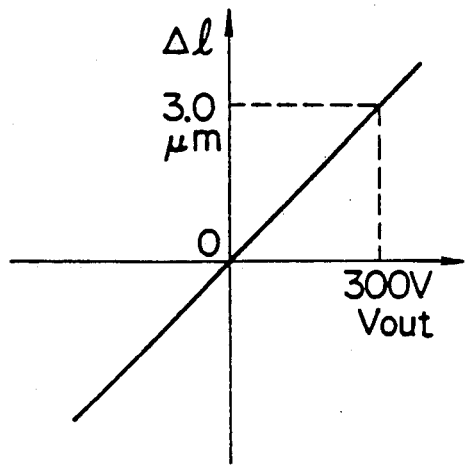
FIG. 21A is a characteristic diagram showing the relationship between an applied voltage of an electrostrictive device and the mechanical displacement thereof.
Figure 21B:
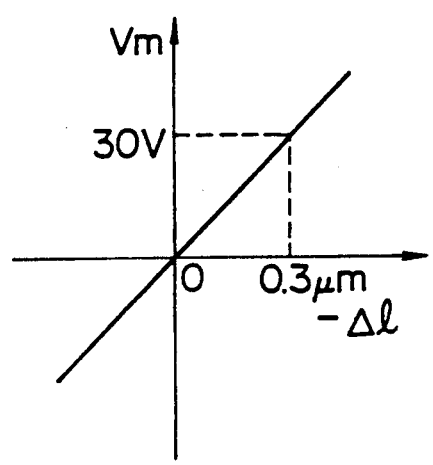
FIG. 21B is a characteristic diagram showing the relationship between the mechanical displacement applied to an electrostrictive device and an output voltage thereof.

FIG. 21A shows the relationship between a voltage $V_{out}$ applied to an electrostrictive element and the mechanical displacement $\Delta l$ of the electrostrictive element. With an increase in the voltage $V_{out}$, the displacement $\Delta l$ increases substantially linearly. FIG. 21B shows a relationship between the deformation, that is, a displacement $\Delta l$ of an electrostrictive element under a mechanical force exerted thereon, and a voltage $V_m$ generated in the electrodes. When a compressive force is applied to the electrostrictive element, a positive voltage is generated by the electrostrictive effect. The relationship between $V_m$ and $\Delta l$ is substantially linear.

Figure 22:
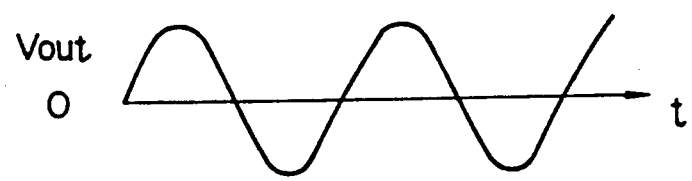
FIGS. 22, 23, 24, 25, 26A, 26B and 26C are waveform diagrams for explaining the operation of the Langevin transducer.
Figure 22:
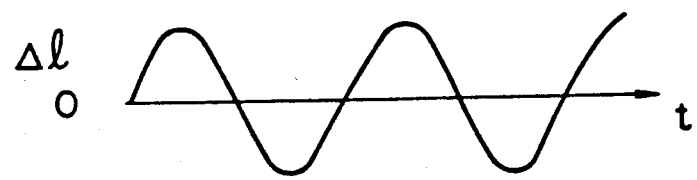
Figure 22:
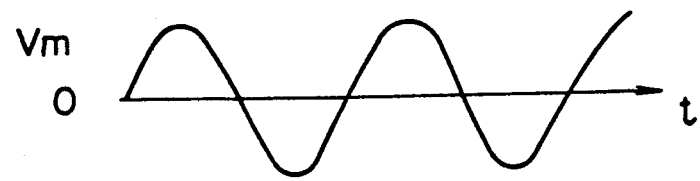

FIG. 22 shows a chronological change in the displacement $\Delta l$ of the electrostrictive device 107 and a monitor electrostrictive element 105 under an AC applied voltage $V_{out}$ applied to the multilayer electrostrictive device 107 according to the present embodiment and the monitor voltage $V_m$ corresponding to the displacement $\Delta l$ of the monitor electrostrictive element 105. Assume that the voltage $V_{out}$ is changed in positive and negative directions with time in, say, sinusoidal form. With the increase in $V_{out}$, the displacement $\Delta l$ of the electrostrictive element also increases. An increased $\Delta l$ acts to exert a compressive force on the monitor electrostrictive element, so that a negative displacement is caused to generate a positive voltage. When the voltage $V_{out}$ decreases, the reverse is the case. As a result, the displacement $\Delta l$ of the electrostrictive element is determined in accordance with the change in $V_m$.

Figure 23:
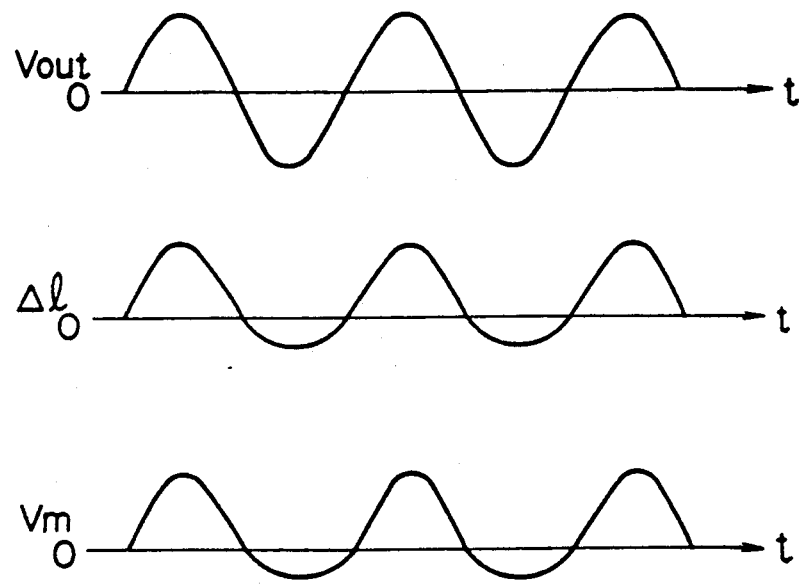

FIG. 23 shows a case in which a voltage of a larger amplitude is applied than in the case of FIG. 22. When $V_{out}$ changes in a negative direction, the changes of $\Delta l$ and $V_m$ are not linear. This is due to the fact that an electrostrictive element has such a characteristic that the displacement $\Delta l$ does not change linearly against a large change in negative voltage. In the event of a change in a $V_{out}$ in positive direction, however, $\Delta l$ and $V_m$ change linearly, and therefore it is possible to determine the value of $\Delta l$.

Figure 24:
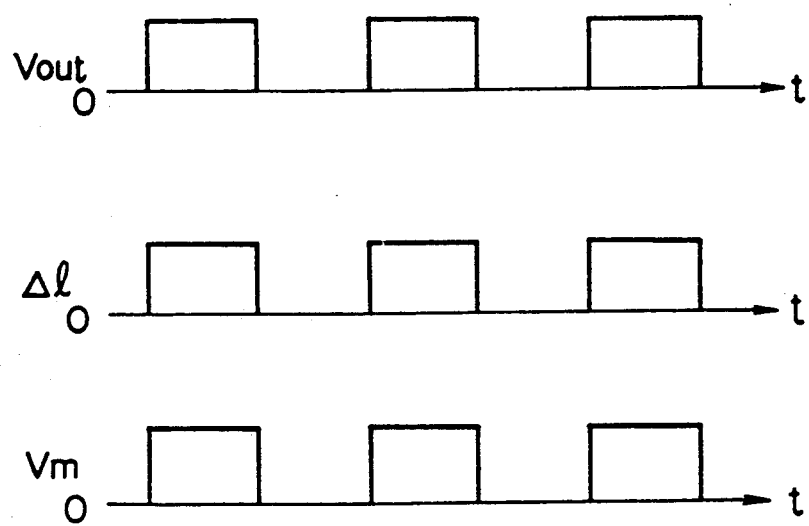

FIG. 24 shows a chronological change in $V_{out}$, $\Delta l$ and $V_m$ with the voltage $V_{out}$ changed in pulse form. The value $\Delta l$ can be determined also in this case from $V_m$.

Figure 25:
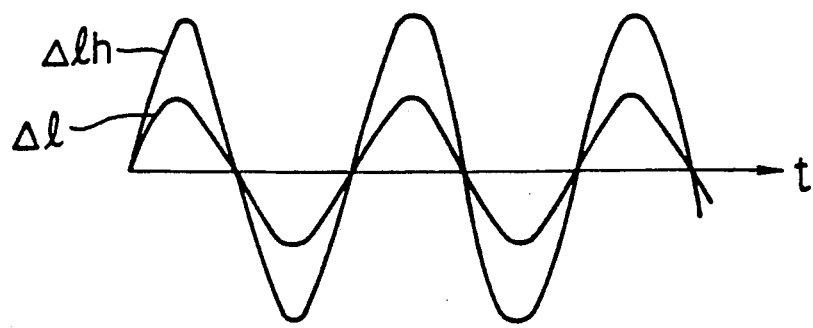

FIG. 25 shows a chronological change in the displacement $\Delta l$ of an electrostrictive element and the displacement $\Delta l_h$ of the horn when it is not in a resonant state. With the increase in $\Delta l$, $\Delta l_h$ also increases. In other words, once the value $\Delta l$ is known, $\Delta l_h$ is also capable of being determined even when the horn is in resonant state.

Figure 26A:
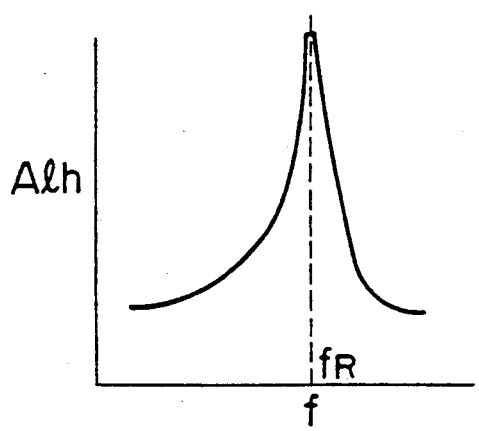
Figure 26B:
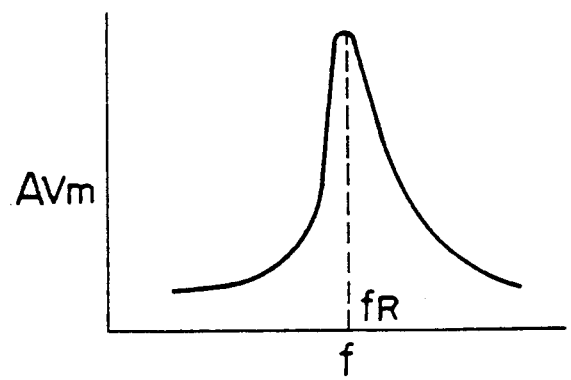
Figure 26C:
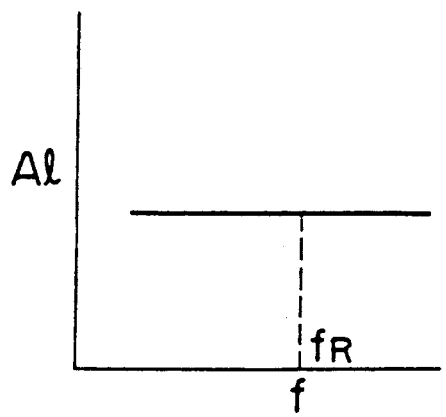

FIG. 26A shows a relationship between the amplitude $A_{lh}$ of the horn in a resonant state versus the frequency f of the voltage applied to the multilayer electrostrictive device 107, and FIG. 26B shows a similar characteristic for the amplitude $A_l$ of the displacement of the multilayer electrostrictive device, while FIG. 26C concerns the amplitude of the monitor voltage $A_{vm}$ of the monitor electrostrictive element associated with the resonant state of the horn. $A_{lh}$ and $A_{vm}$ increase at the resonant frequency $f_R$. This is due to the fact that the monitor electrostrictive element is deformed by the horn displacement. Specifically, if the frequency f of the applied voltage is controlled in a manner to maximize the monitor voltage $A_{vm}$, the value $A_{lh}$ can be maximized. Incidentally, as shown in FIG. 26C, the displacement (amplitude) of the multilayer electrostrictive element itself is proportional to the amplitude of the applied voltage, and therefore is not affected by the frequency f of the applied voltage.

Explanation will be made now about the operation of the microcomputer 101, the frequency control means 102 and the voltage amplifier means 3 with reference to FIGS. 28 and 29.

Figure 28:
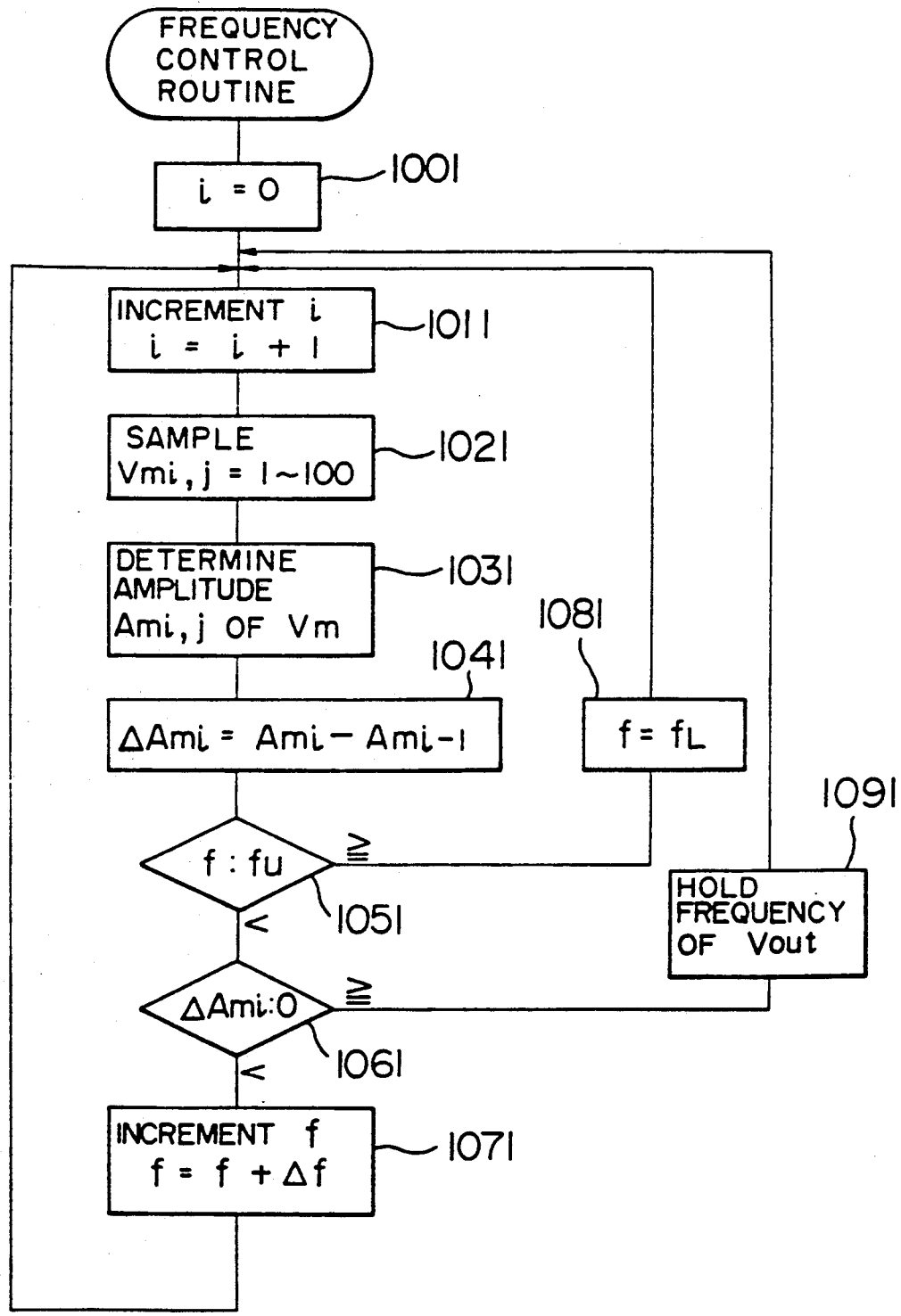
FIG. 28 is a flowchart for explaining the operation of the resonant frequency control system.

FIG. 28 is a flowchart of a frequency control routine for the voltage applied to the multilayer electrostrictive device 107. The microcomputer 1 sets the counter i to zero for the control routine as an initial step at 1001. Step 1011 then increments the control routine i. Each time i is incremented, a monitor voltage $V_{mi,j}$ is sampled at several to several hundred points from the output voltage $V_m$ produced at the amplitude detection means (monitor electrostrictive element) 105 of the transducer 104, and the amplitude $A_{mi}$ of the output voltage $V_m$ of the monitor electrostrictive element 105 is determined from the difference between the maximum and minimum values of the sampled monitor voltages $V_{mi,j}$ (steps 1021 and 1031). The value $A_{mi}$ is expressed as $$A_{mi} = (V_{mi,j})_{max} - (V_{mi,j})_{min}$$

Figure 29:
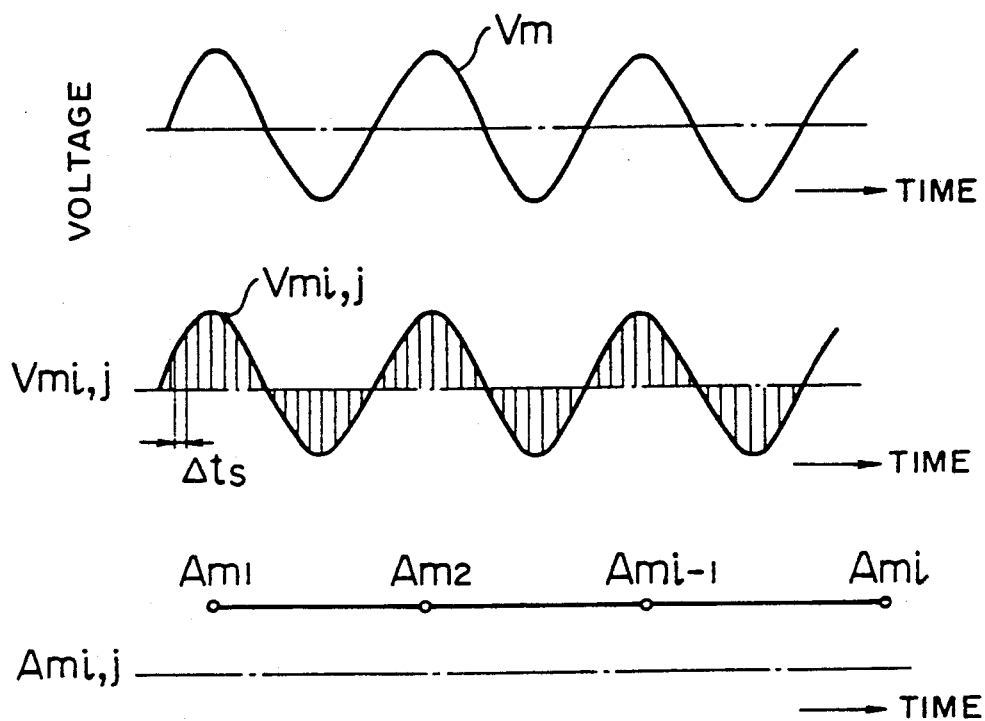
FIG. 29 is a signal waveform diagram for explaining the operation of the resonant frequency control system.

FIG. 29 shows waveforms representing the conditions of steps 1021 and 1031. As shown in this diagram, the sampling time of the monitor voltage $V_{mi,j}$ at a point is assumed to be $\Delta ts$, which is set out of the range from 1 to 100 $\mu s$.

Assume, for instance, that $\Delta ts$ is set to 100 $\mu s$ and the monitor voltage $V_{mi,j}$ is sampled at 100 points for each control routine process to determine $A_{mi}$. The sampling time of 10 ms ($=100 \mu s \times 100$) is required.

As a result, the frequency search is conducted at intervals of 10 ms. This is almost as frequent as changes in the fuel flow rate, and therefore is considered to meet the load changes sufficiently. If a more rapid frequency search is desired, $\Delta ts$ is reduced to, say, 10 $\mu s$ or the number of samples to about ten.

In the case of a small load variation, on the other hand, the frequency search time may be lengthened or, as an alternative, a frequency search may be conducted by sampling at predetermined intervals of time. As an example, $\Delta ts$ is set to 100 $\mu s$, the number of samples to 100 and the time interval to 1000 $\mu s$. Characters $A_{m1}$, $A_{m2}$, ..., $A_{mi-1}$, $A_{mi}$ in FIG. 29 denote the amplitudes of the output voltage $V_m$ determined from the monitor voltage $V_{mi,j}$ respectively each time the count time i is incremented in the control routine. Steps 1041, 1061 compare the present $A_{mi}$ with the previously-sampled $A_{mi-1}$ for each control routine, and if $A_{mi}$ is found to larger, the frequency f of the applied voltage is held (step 1091). If $A_{mi}$ is equal to $A_{mi-1}$, on the other hand, the frequency f is also held to the extent that the particular value of $A_{mi}$ has already reached a maximum after repetitions of the control routine i. If $A_{mi}$ is reduced, by contrast, f is incremented by $\Delta f$ (step 1071). More specifically, with the frequency f changed, the monitor voltage $V_{mi,j}$ is sampled again in the next control routine i, and the resonant frequency is searched for each control routine i until the appropriate resonant frequency is found. If the frequency f variably controlled for the search reaches a set upper limit $f_U$ for the search frequency, the frequency f is restored to the set lower limit $f_L$ through steps 1051 and 1081, so that f is incremented by $\Delta f$ again to search for the resonant frequency. The value $f_L$ is set to a level lower than the resonant frequency initially set for the transducer, while $f_U$ is set to a level higher than the initially set resonant frequency of the transducer, so that in the event of a change in resonant frequency f, the resonant frequency f thus changed may be searched by being incremented by $\Delta f$ within the range from $f_U$ to $f_L$.

If the reference resonant frequency is 30 KHz, for instance, $f_U$ is set to 35 KHz, $f_L$ to 25 KHz and $\Delta f$ to 0.1 KHz.

In this way, the microcomputer 101 decides whether the transducer 104 is in resonant state, that is, whether the multilayer electrostrictive device 107 is operating under a resonant frequency or not on the basis of the amplitude of the output voltage $V_m$ of the monitor electrostrictive element 105. According to the embodiment under consideration, this resonance monitoring process is utilized in such a manner that when the resonant frequency to be applied changes, the resonant frequency after change to be applied to the multilayer electrostrictive device 107 is searched through the frequency regulating operation of the microcomputer 101 and the frequency control means 102, and this particular resonant frequency voltage is applied to the multilayer electrostrictive device 107 of the transducer 104.

As explained above, according to the present embodiment, the multilayer electrostrictive device 107 has built therein the monitor electrostrictive elements 105 impressed with not any voltage thereby to detect the change in the mechanical vibration of the transducer directly, thus making it possible to improve the accuracy of the resonance monitoring of the transducer. Further, through this monitoring of the resonant state of the transducer, the resonant frequency of the voltage to be applied to the multilayer electrostrictive device is controlled with higher accuracy in accordance with the load change. The performance of transducer-applied devices such as the fuel injection valve can thus be improved.

Furthermore, since the monitor multilayer electrostrictive element can be easily built in as a part of the multilayer electrostrictive device, the assembly processes of the transducer resonance monitor means is reduced in number and simplified at the same time. In addition, the monitor multilayer electrostrictive elements 105 can be mounted in overlaid relationship with the multilayer electrostrictive device 107 by such securing means as a bolt and a nut. For this reason, even in an application under an unfavorable operating environment, the endurance of the resonance monitor means of this type is improved without adversely affecting the required functions.

Figure 30:
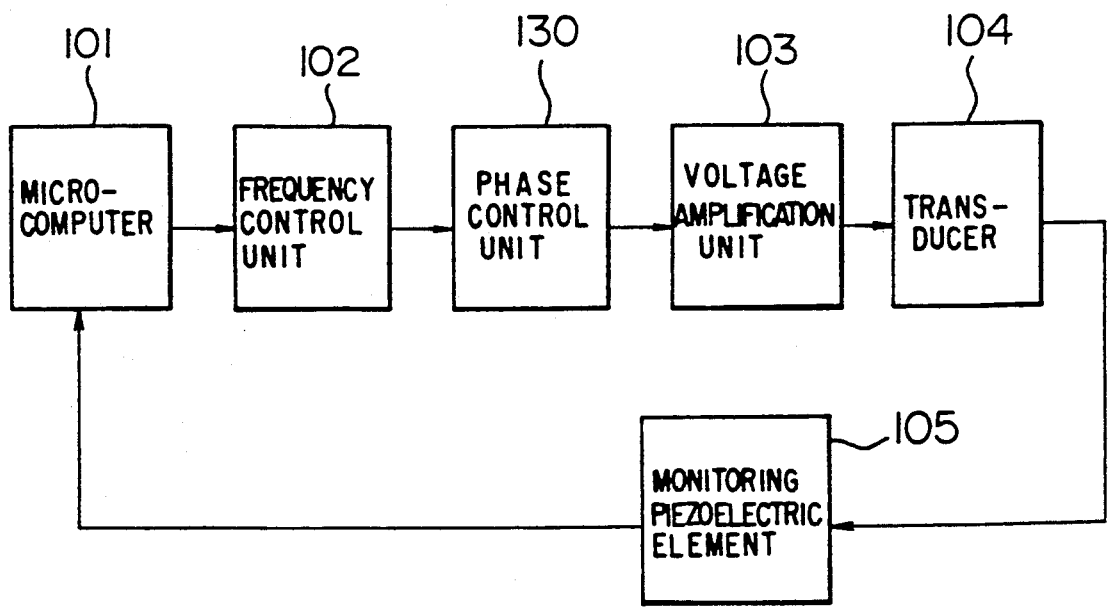
FIG. 30 is a block diagram showing another example of the resonant frequency control system.

FIG. 30 is a diagram showing a system configuration of a monitor system according to another embodiment of the present invention. The same reference numerals as those used in the first embodiment designate identical or similar component parts as in the first embodiment. This embodiment further comprises a phase control unit 130 in addition to all the component parts of the system of the first embodiment. The addition of the phase control unit 130 is based on the necessity that the phase difference $\theta$ between the mechanical vibration making up the output of the transducer 104 (that is, the output voltage $V_m$ of the monitor electrostrictive element 105) and the resonant frequency voltage $V_{out}$ to be applied to the multilayer electrostrictive device 107 is required to be reduced to zero if the transducer is to be kept in resonance. Specifically, the amplification system for the resonant frequency voltage has such a phase characteristic that there may occur a phase difference between $V_m$ and $V_{out}$, and therefore the phase of $T_{out}$ is controlled to reduce $\theta$ to zero.

Figure 31A:
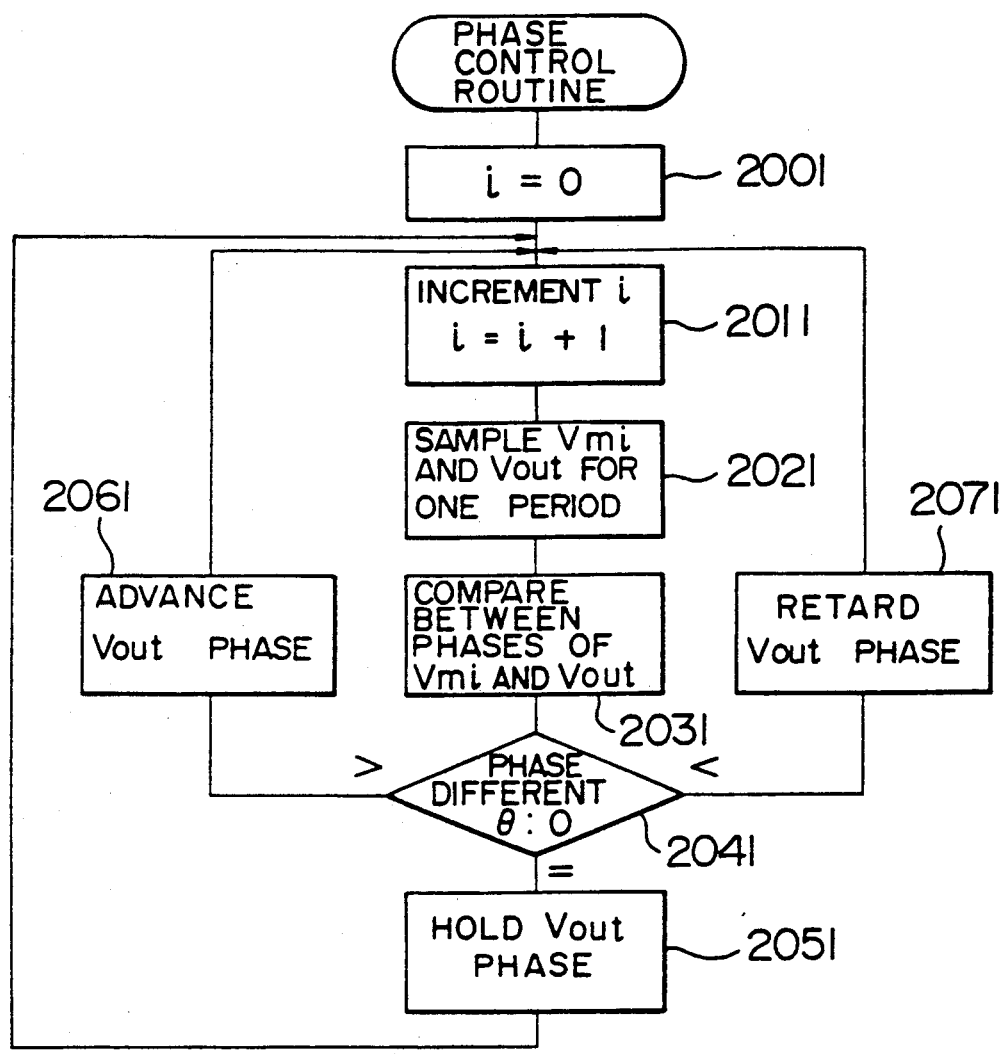
FIG. 31A is a flowchart for explaining the operation of the resonant frequency control system shown in FIG. 30.
Figure 31B:
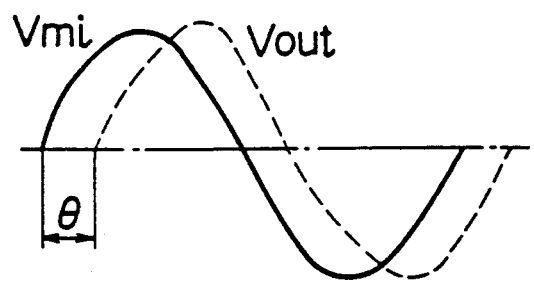
FIG. 31B is a waveform diagram showing the condition in which an applied voltage $V_{out}$ and a monitor voltage $V_m$ have a phase.

This phase control operation is performed by the phase monitor operation of the microcomputer 101 and the phase control operation of the phase control means 130. A phase control flowchart is shown in FIG. 31A.

In this embodiment, for performing phase control of the resonant frequency voltage, the control routine counter i is set to zero (step 2001), and then i is incremented (step 2011).

Step 2021 then causes the microcomputer 101 to sample a period of the monitor voltage $V_m$ and the applied voltage $V_{out}$, followed by step 2031 for comparing $V_m$ with $V_{out}$. If the phase difference between $V_m$ and $V_{out}$ is zero, the phase of the resonant frequency of $V_{out}$ is held (step 2051). If the phase difference is such that $V_m$ is larger than $V_{out}$, on the other hand, the process proceeds to step 2061 for effecting the phase advance control of $V_{out}$ to reduce the phase difference to zero, while if the phase difference is such that $V_m$ is smaller than $V_{out}$, step 2071 performs a phase retardation control of $V_{out}$ to reduce the phase difference $\theta$ to zero. These operations of phase difference monitoring provide a decision as to the necessity of phase control and the computation of a phase control amount is processed by the microcomputer 101, and on the basis of the resultant computed value, the phase control unit 130 executes a phase control operation. According to the embodiment under consideration, a unit amount of addition of phase advance or delay of the control routine is set, so that the control routine counter i is incremented for phase control until the phase difference is reduced to zero.

For example, in order to cause $V_{out}$ to coincide with $V_m$, assume that the phase of $V_{out}$ is to be advanced. The following equation should be satisfied.

$$V_{out} = V_{out} + \frac{dV_{out}}{dt} k$$

where k is a constant. This value $V_{out}$ may be converted into a digital value for computation of the phase difference control of the microcomputer 1 in the manner mentioned below.

$$V_{outi} = V_{outi} + GAIN(V_{outi} - V_{outi-1})$$

The phase is advanced in this way. The GAIN is a constant for determining the amount of phase advance. In other words, the GAIN is changed until the phase difference $\theta$ is reduced to zero.

If the phase of $V_{out}$ is to be retarded, on the other hand, the relationship shown below is required to hold.

$$V_{out} = V_{out} + k \int V_{out} dt$$

where k is a constant. This may be converted into a digital value in the manner mentioned below.

$$V_{outi} = V_{outi} + GAIN \sum_{i=1}^{n} V_{outi}$$

The phase is advanced in this way. The GAIN is a constant for determining the amount of phase delay. Specifically, the GAIN is changed until the phase difference $\theta$ becomes zero. Also, n is set to 10 to 100.

According to this embodiment, in addition to the effect obtained in the above-mentioned first embodiment, the advantage results that, due to the phase characteristics of an amplifier system for the voltage applied to the transducer 104, a change in the phase difference which may occur between the resonant frequency $V_{out}$ and the monitor voltage $V_m$ is compensated to attain coincidence automatically, thereby holding the transducer in resonance more accurately.

Figure 32:
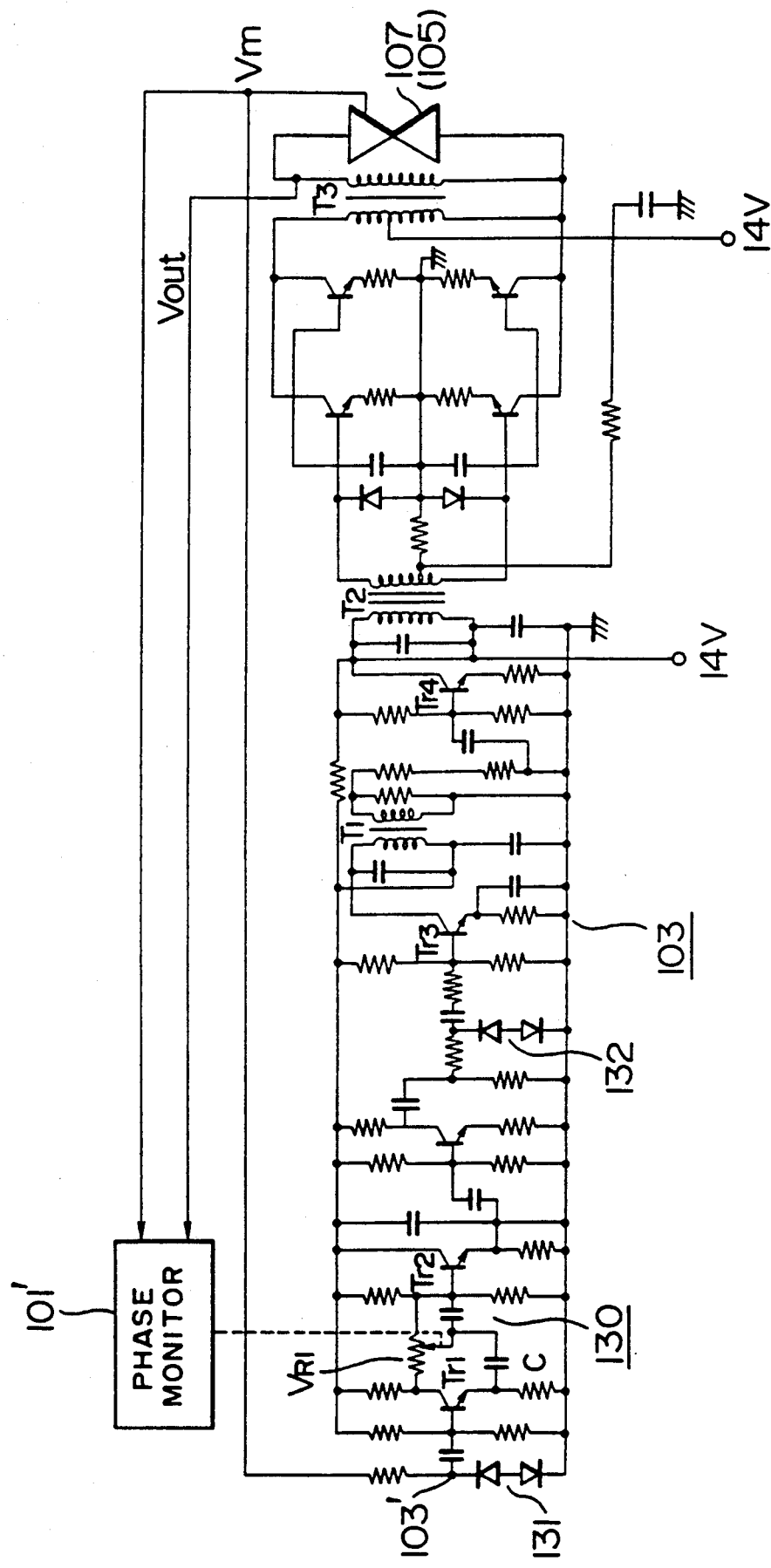
FIG. 32 is a circuit diagram showing a specific example of a phase control circuit and an amplifier circuit used with the resonant frequency control system.

FIG. 32 shows an example of the configuration of a specific example of the phase control unit 130, the waveforms of operation of which are shown in FIG. 33. With reference to FIGS. 32 and 33, a specific case of the phase control operation described will be explained more in detail.

Figure 33A:
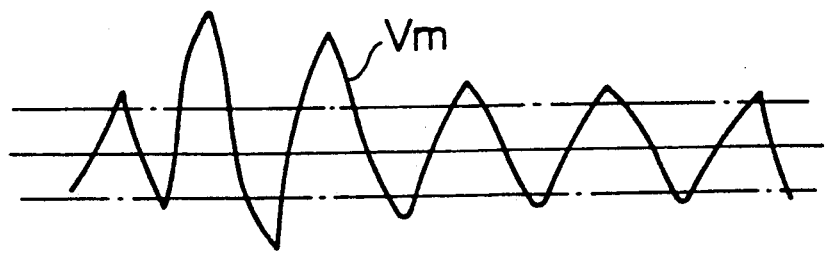
FIGS. 33A to 33E are waveform diagrams showing the circuit operation in FIG. 32.
Figure 33B:
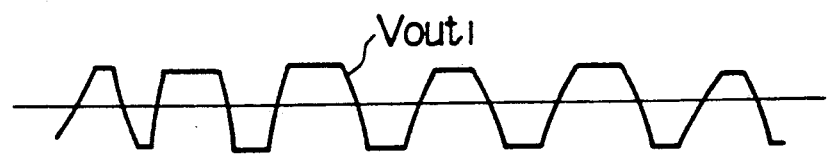

Transistors $T_{r1}$, $T_{r2}$, $T_{r3}$ and $T_{r4}$ in the respective stages in FIG. 32 are for amplification of the voltage $V_{out}$ applied to the multilayer electrostrictive device 107 of the transducer 104, and characters $T_1$, $T_2$ and $T_3$ designate transformers. The amplifier unit 103 made up of these amplifier elements operates to amplify voltage $V_{out}$ set to the resonant frequency in advance and is applied to the multilayer electrostrictive device 107 of the transducer 104 to excite a mechanical vibration in the multilayer electrostrictive device 107. The signal $V_m$ of the monitor electrostrictive elements 105 built in the multilayer electrostrictive device 107 is applied to the internal terminal 103' of the amplifier on the one hand, and the voltage $V_{out}$ applied to the multilayer electrostrictive device 107 and the signal $V_m$ (monitor voltage) are applied to the phase monitor means 1' on the other. The monitor signal $V_m$ applied to the input terminal 103' of the amplifier is amplified through transistors $T_{r1}$ to $T_{r4}$ and transformers $T_1$ to $T_3$, and then is fed back again to the input of the multilayer electrostrictive device 107. The amplitude of the voltage $V_m$ is under constant change with the load (such as the fuel flow rate) applied to the transducer, and therefore the direct application thereof to the input terminal 103' would cause a constant variation in the input power for the transducer. In order to dampen this variation, a zener diode 131 of RD5A type inserted at the input terminal is used to hold the upper limit of the feedback input voltage (FIG. 33A). Also, a zener diode 132 disposed after the transistor $T_{r3}$ makes up a limiter for keeping the input of the transistor $T_{r4}$ constant regardless of the feedback input variations (FIG. 23B).

Figure 33C:
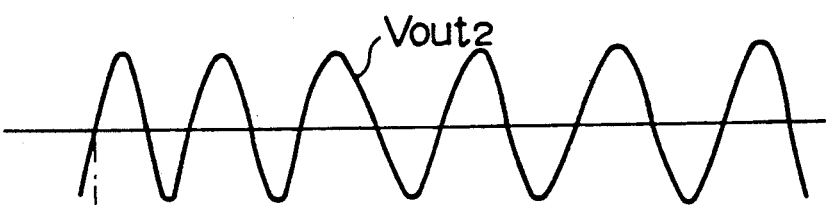
Figure 33D:
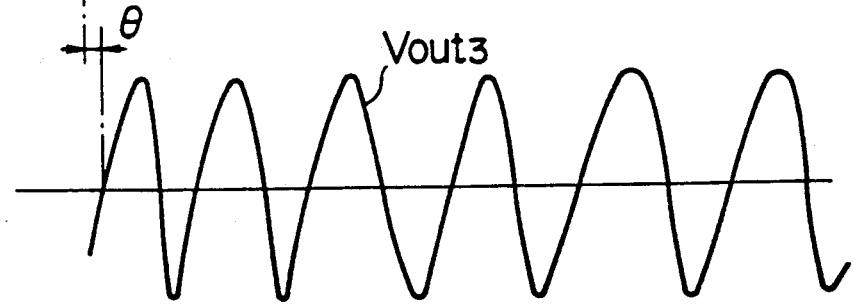
Figure 33E:
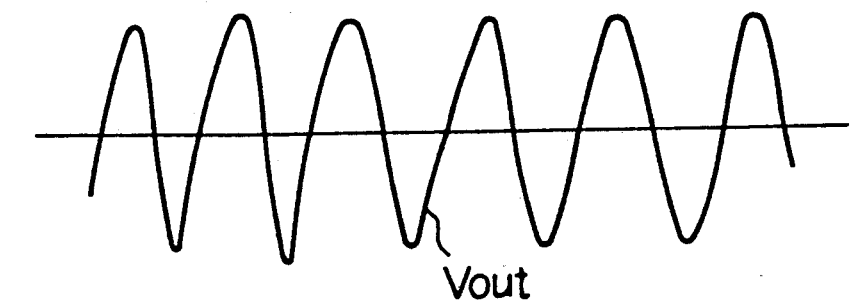

The output circuit of the transistor $T_{r4}$ makes up an LC circuit tuned to the mechanical resonance frequency of the transducer. The voltage $V_{out1}$ having a form similar to a rectangular waveform under the effect of the limiter is amplified to $V_{out2}$ of a fixed amplitude in sinusoidal form in this stage (FIG. 33C). In the next drive stage, this voltage is further amplified to $V_{out3}$ (FIG. 33D) so that $V_{out}$ is applied through the output transformer $T_3$ to the transducer.

In this amplification system, the amplifier circuit has its own phase difference, and therefore there develops a phase difference between the applied voltage $V_{out}$ and the monitor voltage $V_m$. According to this embodiment, this phase difference $\theta$ is monitored by the phase difference monitor means 101', and if there occurs any phase difference $\theta$, a variable resistor $V_{R1}$ of a phase regulation circuit 130 built in the amplifier circuit 130 is operated to regulate the phase difference to zero. The phase regulation circuit 130 is a combination of the variable resistor $V_{R1}$ and a capacitor C.

Now, other specific examples of the multilayer electrostrictive devices used with each of the above-mentioned embodiments will be explained with reference to FIGS. 16 to 20. In the diagrams, those component elements designated by the same reference numerals for the multilayer electrostrictive device (first example) of FIG. 12 denote the same or equivalent component parts respectively.

Figure 16:
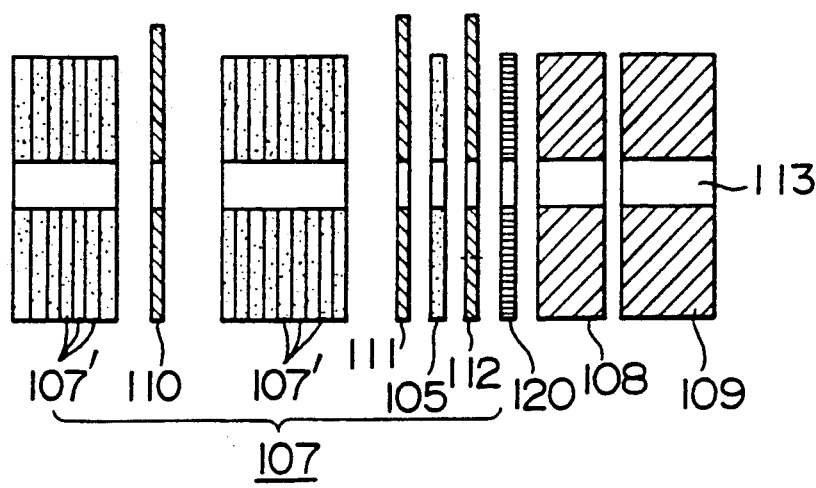
FIG. 16 is an exploded sectional view showing a second example of Langevin transducer.

FIG. 16 shows a second specific example of the multilayer electrostrictive device 107. In this example, in place of the pair of the electrostrictive elements 105 in the first example as amplitude monitor electrostrictive elements, a single electrostrictive element 105 is used. A monitor electrode 112 is interposed between the positive electrode of the monitor electrostrictive element 105 and an insulation member 120 where from a monitor voltage $V_m$ is retrieved. This configuration requires only one monitor electrostrictive element 105 and therefore the production cost is saved.

Figure 17:
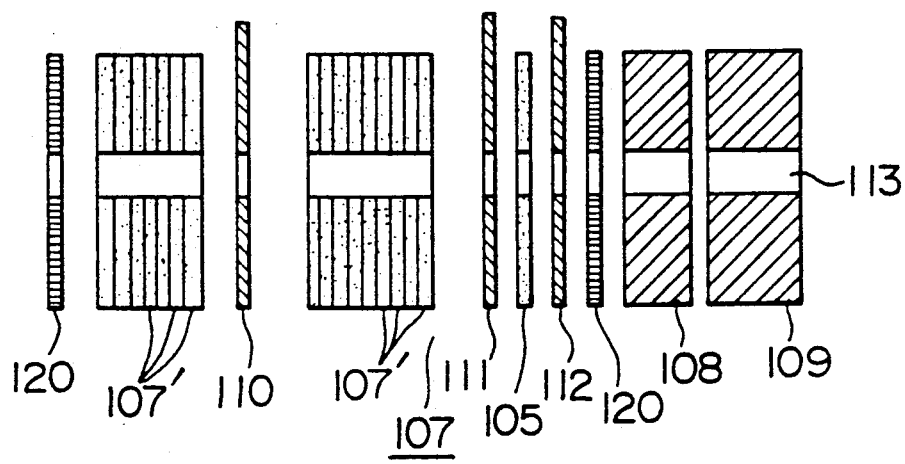
FIG. 17 is an exploded sectional view showing a third example of Langevin transducer.

FIG. 17 shows a third specific example of the multilayer electrostrictive device 107. In this embodiment, in addition to the structure of the multilayer electrostrictive device of the second example, an insulation member 120 is interposed between the multilayer electrostrictive element 107 and the horn. In this embodiment, the distance between a common electrode 110 of the electrostrictive device 107 and the horn is increased, thereby making difficult any arc discharge from the positive electrode to the horn. As a result, it is possible to apply a comparatively high voltage to the multilayer electrostrictive device 107.

Figure 18:
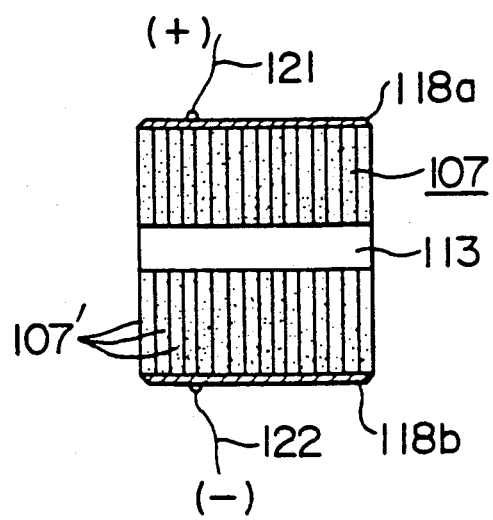
FIG. 18 is a sectional view showing a fourth example of Langevin transducer.

FIG. 18 is a diagram showing a fourth example of the multilayer electrostrictive device 107. In this example, without interposing any electrode plate between electrostrictive elements 107', a multiplicity of electrostrictive elements 107' are laid one on another. The lead electrodes 118a, 118b along the outer peripheral part of the electrostrictive device 107 thus formed are connected directly with a positive electrode wire 121 and a negative electrode wire 122. In this case, the electrode plates 110, 111 are eliminated, and therefore the construction is simplified with the multilayer electrostrictive device reduced in size.

Figure 19A:
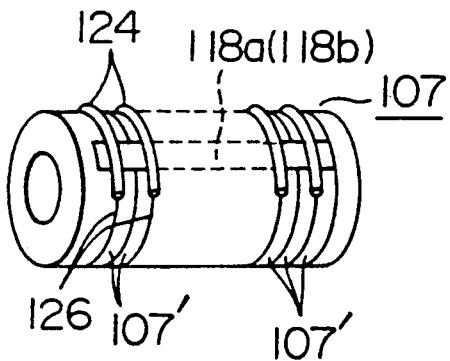
FIG. 19A is a perspective view showing a fifth example of Langevin transducer.
Figure 19B:
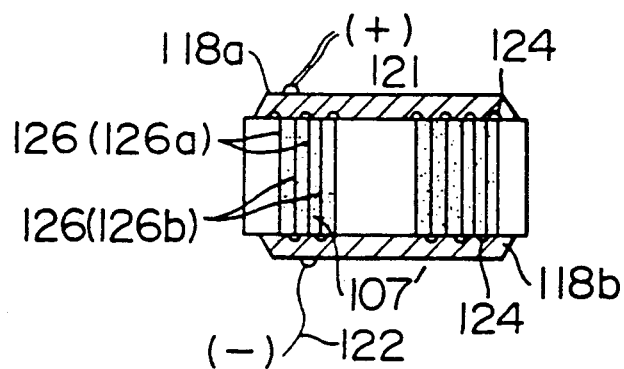
FIG. 19B is a partial sectional view showing the same example.
Figure 19C:
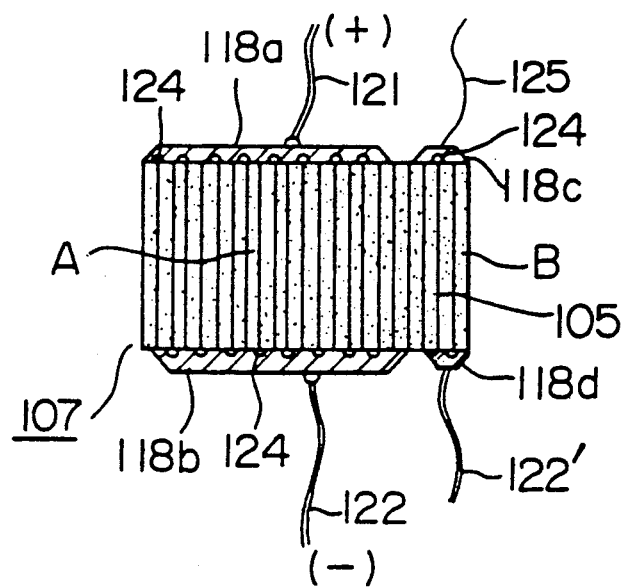
FIG. 19C is a general sectional view of the same.

A fifth specific example of the multilayer electrostrictive device 107 is shown in FIGS. 19A, 19B and 19C. This embodiment comprises electrostrictive elements 107' with positive electrodes and negative electrodes facing each other and having an internal electrode plate (made of such a material as Ag-Pd alloy) interposed between respective pairs of electrodes thus oppositely arranged. Further, an insulation glass 124 is bonded to every other internal electrode plate 126, on which a common lead electrode 118a (118b) is electrically connected. These insulation glass pieces 124 and the lead electrode 118a, 118b are arranged in correspondence with an internal electrode plate 126 (specifically designated as 126b) interposed between the positive electrodes of the electrostrictive elements 107' and an internal electrode plate 126 (specifically designated as 126b) interposed between the negative electrodes thereof as shown in FIG. 19B. The respective lead electrodes 118a, 118b are connected to a positive electrode wire 121 and a negative electrode wire 122, respectively. In this structure, the presence of the insulation glass pieces 124 prevents interference between the lead electrodes 118a and 118b, thus making it possible to connect the positive electrodes to each other and the negative electrodes to each other respectively. Further, as shown in FIG. 19C, the multilayer electrostrictive device 107 may be divided beforehand into a voltage application group A of elements and a group B of monitor electrostrictive elements 105. The group A is constructed in the manner shown in FIGS. 19A and 19B, and the group B has arranged therewith insulation glass 124, monitor lead electrodes 118c, 118d and monitor wires 128, 129 as in the case of group A. In this configuration, the electrostrictive elements 107' of group A may be impressed with a voltage at the resonant frequency through the electrode elements 121, 122, 118a, 118b, and it is possible to retrieve a monitor voltage $V_m$ from the electrostrictive elements 105 through the monitor elements 118c, 118d, 122', 125. This construction reduces the thickness of each of the electrostrictive elements and these elements can be sintered, thus improving the quality and permitting a low-voltage drive.

FIGS. 20A to 20D are diagrams showing an example of electrode arrangement of the multilayer electrostrictive device 107.

Figure 20A:
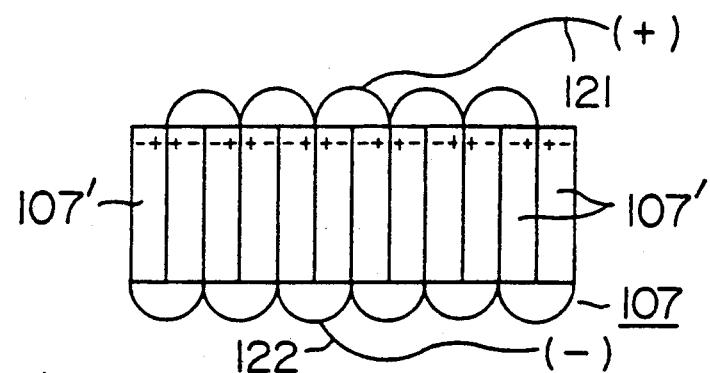
FIGS. 20A to 20D are diagrams illustrating specific examples of the construction of electrical connection of Langevin transducer.
Figure 20B:
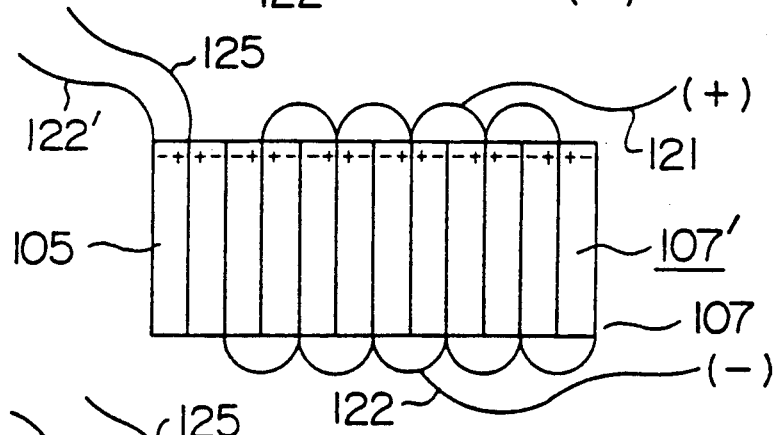
Figure 20C:
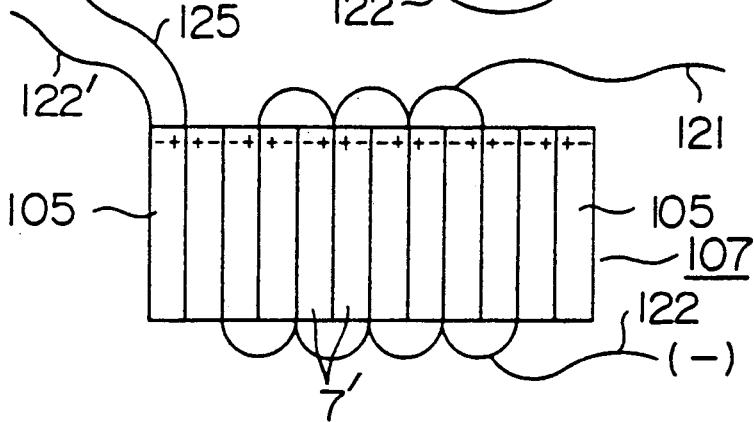

FIG. 20A shows a multilayer electrostrictive device 107 comprising a plurality of electrostrictive elements 107' arranged one on another with the same type of electrodes thereof facing each other, in which the electrodes of the same polarity are connected by a voltage application wire 121, 122 respectively. FIG. 20B is a diagram showing a multilayer electrostrictive device 107 comprising a plurality of electrostrictive elements 107' and a single electrostrictive element 105 at an end thereof not connected to a voltage application wire, but to monitor signal wires 125, 122'. As an alternative, as shown in FIG. 20C, the multilayer electrostrictive device 107 may comprise a pair of electrostrictive elements 105 at the ends thereof without being supplied with any voltage, one of which is connected to a monitor wire 125, 122'. In this last-mentioned case, the presence of the monitor electrostrictive elements 105 increases the distance between the positive electrode of the voltage application electrostrictive element 107' and the horn, thus making atmospheric discharge difficult from the positive electrode to the horn. As a consequence, a comparatively large voltage can be applied to the electrostrictive device.

Figure 20D:
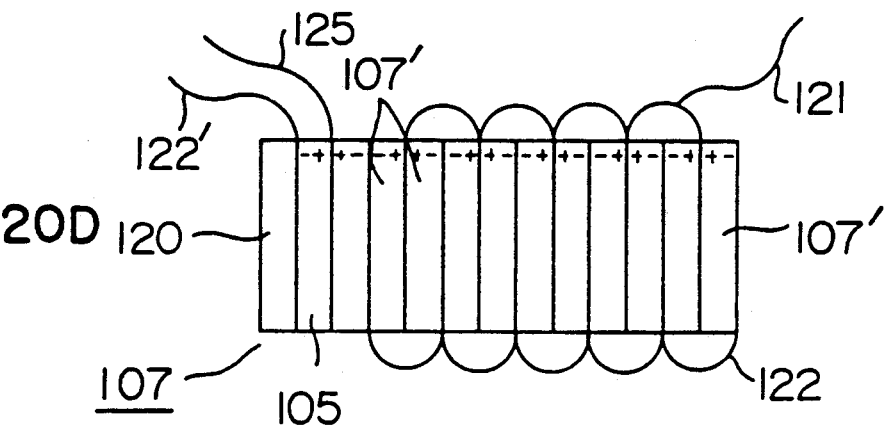

FIG. 20D shows a configuration in which a monitor electrostrictive element 105 is arranged at an end of the multilayer electrostrictive device 107, and the negative electrode side of the monitor electrostrictive element 105 is insulated from the horn by means of an insulation member 102 made of such a material as mica. In this case, the monitor electrostrictive element 105 is electrically insulated from the horn, and therefore a signal $V_m$ less affected noises or the like is produced.

As described above, according to this embodiment, a multilayer electrostrictive device, which is used as a source of mechanical vibration of a Langevin transducer, comprises at least one of the component electrostrictive elements used as a monitor electrostrictive element supplied with no voltage. If a mechanical vibration of the transducer is transmitted to this particular monitor electrostrictive element, an output voltage (electrical oscillation) proportional to the mechanical vibration is produced therefrom. The amplitude of the output voltage from this monitor electrostrictive element assumes a maximum value when the whole transducer, that is, a combination of the multilayer electrostrictive device and the horn vibrates in resonance. As a result, if it is decided whether the amplitude of the output voltage of the monitor electrostrictive element, or specifically, a monitor output assumes a maximum value or not, it is determined whether the transducer is in a resonant state or not.

By using this method of monitoring a resonant state, it is thus possible to monitor a change of the resonant state of a transducer caused by a change in a transducer load, and hence a change in the resonant frequency of a voltage to be applied to a multilayer electrostrictive device. Further, by application of this resonance monitoring method, it is possible to search for a resonant frequency after a change in the voltage applied to a source of mechanical vibration (multilayer electrostrictive device) of a transducer.

Also, according to the present embodiment, an electrostrictive element for monitoring a resonant state is configured as a part of a multilayer electrostrictive device, so that the mounting work of the monitor electrostrictive element is conveniently simplified. At the same time, the monitor electrostrictive element can be firmly mounted on the horn together with a multilayer electrostrictive device by appropriate fastening means, such as a bolt and nut, with the result that a proper mounting condition is maintained without separation of the monitor electrostrictive element even under an unfavorable operating environment.

Now, means for transporting and guiding the fuel after metering to a vibration surface as a vibration enlarging section will be explained in detail.

When an injection port 21 is opened with a ball valve 8 coming away from the valve seat, as shown in FIG. 2B, the fuel is supplied through the injection port 21 and subsequently through V-shaped guide paths (hereinafter sometimes referred to as "the transport paths") 21a, 21b to a vibration surface 24.

In the process, the fuel proceeds in the form of wave along the inner wall of the injection port 21 and the inner wall surfaces of the guide paths 21a, 21b as shown.

As a result, the case often seen in the prior art systems in which the fuel is injected without being atomized directly from the injection port is eliminated.

Figure 11:
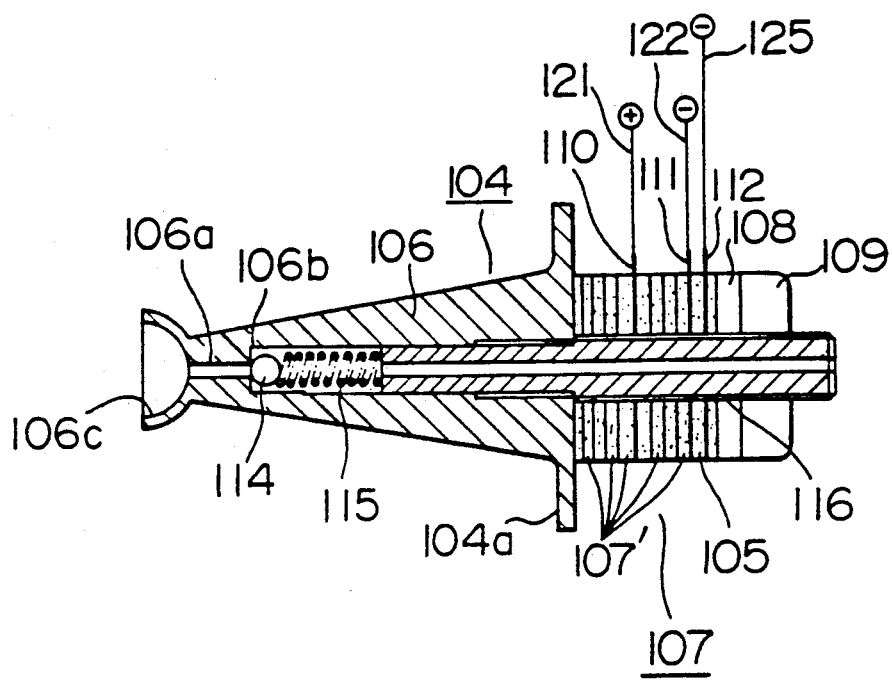
FIG. 11 is a longitudinal sectional view of a fuel injection valve using a Langevin transducer which makes up a subject of application of the present invention.
Figure 12:
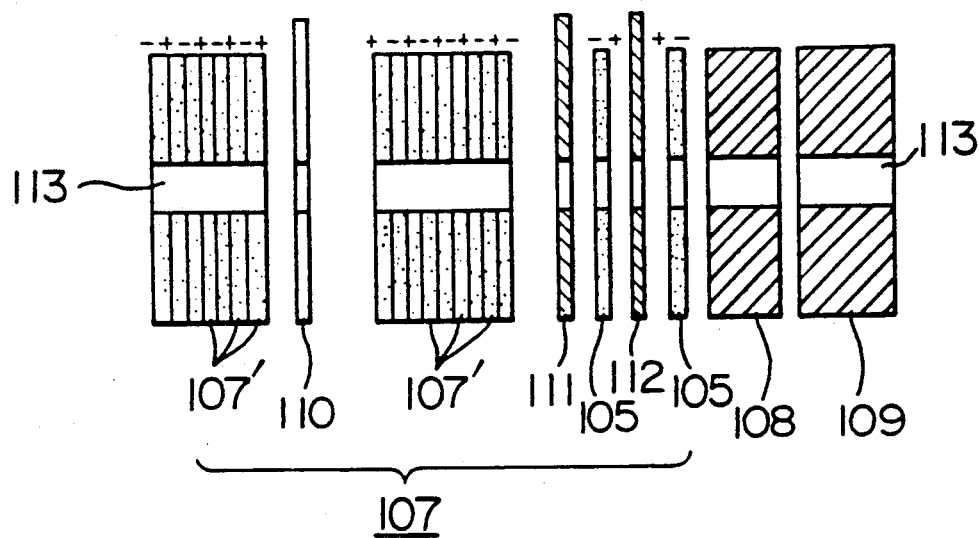
FIG. 12 is an exploded sectional view showing a first example of Langevin transducer according to the present invention.

These guide paths are not necessarily required, but as shown in FIG. 11, the seat 106 may be only connected to the vibration surface 106c with a path 106a of a predetermined diameter and a predetermined length.

If this path is short, the fuel is liable to be injected directly from the outlet at the forward end, thus deteriorating the atomization performance. Depending on the particle size of the fuel, our study from various aspects shows that the length of the path should preferably be 10 to 15 mm if the particle size is to be reduced to less than 100 μm.

The aforementioned embodiments concern what may be called a parabolic type of the vibration surface in concave shape at the forward end of the horn. The shape of the vibration surface, however, is not limited to such a construction. Instead, it may take a flat form as shown in FIG. 34A or a convex semicircular form as shown in FIG. 34C with equal effect. Any of these shapes may be selected on the basis of the atomization angle $\theta$. The end surface with the horn diameter uniform to the forward end thereof may be used as a vibration surface in the manner shown in FIG. 34D.

The outer diameter of the horn, as shown in the embodiments of FIGS. 1 and 11, may be tapered from the mounting flange to the vibration enlarging section at the forward end thereof or this particular part may be formed as a cylinder with uniform diameter.

Figure 35:
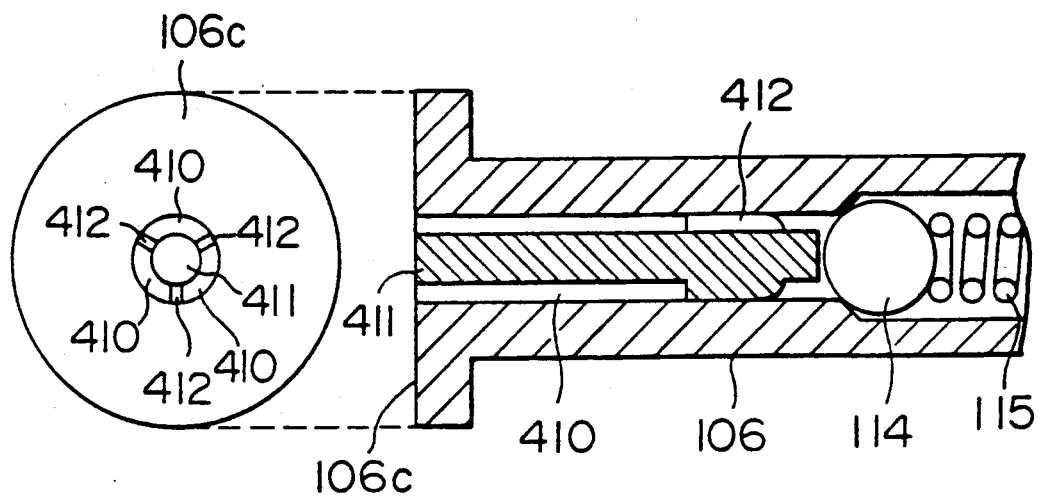
FIG. 35 is a diagram showing another example proposed as the horn of the injection valve.

In the example shown in FIG. 35, a spacer 411 is inserted in the central path of the horn 106, and there are formed three reduction paths 412 followed by an annular path 410 between the spacer 411 and the horn 106.

In this example since the spacer 411 is constructed as part of the same vibration system as the horn, the wavy flow of the fuel also occurs along the peripheral surface of the spacer 411, thereby making it possible to supply a greater amount of the fuel to the vibration surface 106c at the forward end of the horn.

Figure 36:
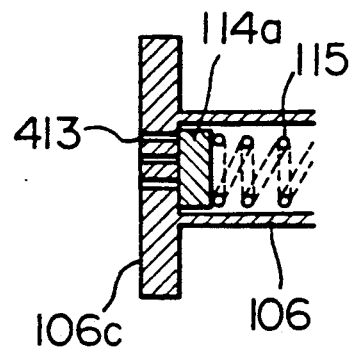
FIG. 36 is a diagram showing a still another example proposed as the same horn.

The example of FIG. 36 is a case in which there are formed a plurality of fuel paths 413 of small diameter with the forward end opening to the vibration surface 106c, which paths are adapted to be opened or closed by a flat valve body 114. In this example, the fuel path is shortened in length for a shorter length of the whole device. It is necessary that a wavy flow of the fuel be formed along the internal surfaces of the fuel paths 413.

The spacer 411 may be replaced with equal effect by a steel chip cut with a spiral groove inserted in the guide paths.

Figure 37:
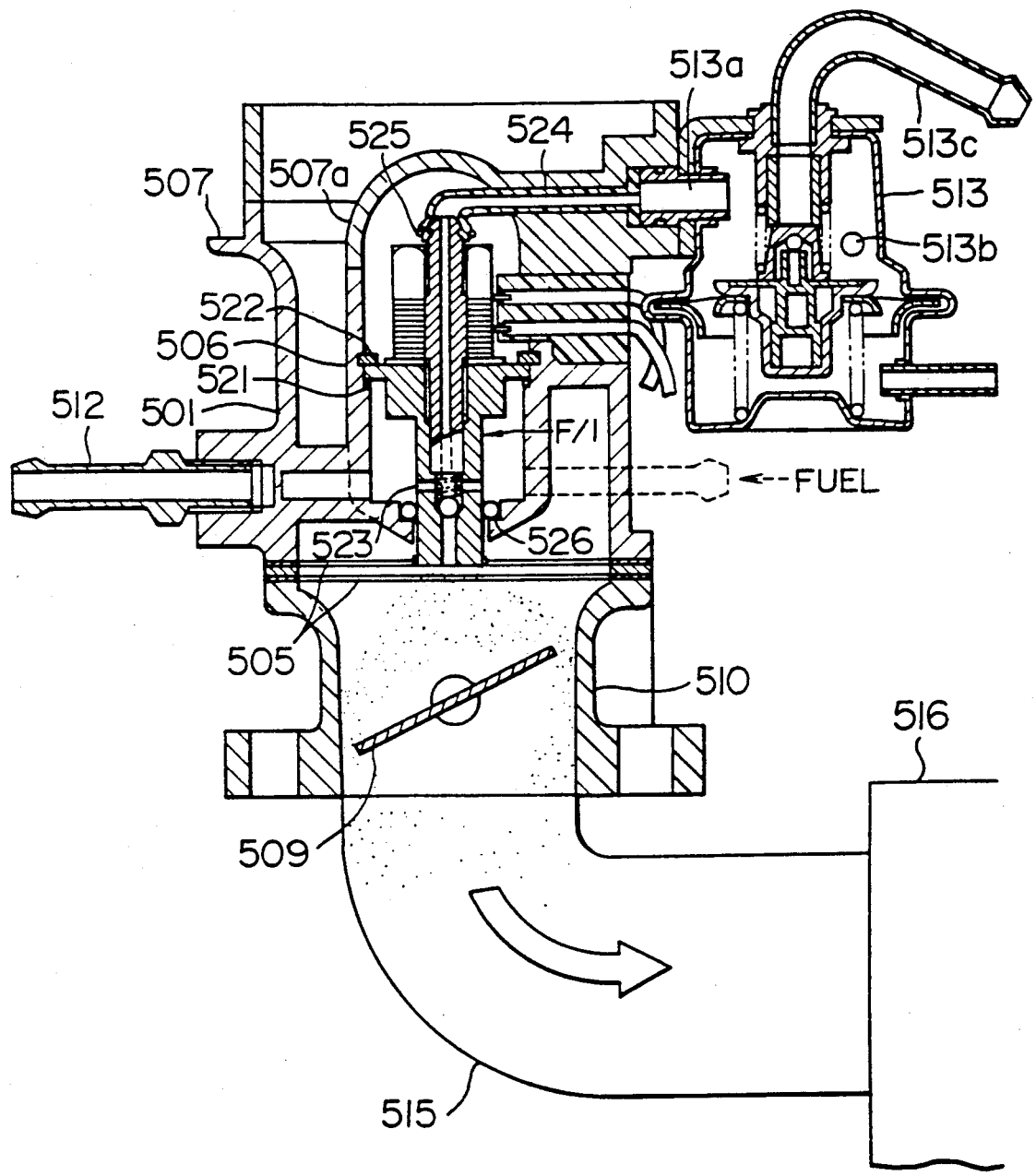
FIG. 37 is a sectional view showing an embodiment of a single-point injector with a fuel injection valve according to the present invention arranged upstream of the throttle valve.

FIGS. 37 to 39 show an example of a fuel injection valve according to the present invention as applied to what is called a single-point injection system of upstream injection type comprising the sole fuel injection unit located upstream of the throttle valve.

The fuel injection valve is substantially identical to that shown in FIG. 11 in construction except for the fact that in the fuel injection valve according to this embodiment, the horn has a uniform diameter along the whole length thereof, that the vibration surface thereof at the forward end has substantially the same diameter as the horn and that a fuel overflow hole radially extends through the horn in the vicinity of the upstream part of the ball valve.

An injection body 507 of an intake manifold 501 has a housing 506 formed substantially at the central part thereof. The injection valve is firmly secured with the flange thereof held by an elastic ring 521 and a C-ring 522 at an engaging member formed on the inner wall of the housing 506.

A cover 507a of the housing 506 covers hermetically the upper part of the housing 506. The cover 507a with a rubber hose 524 the forward end of which is connected by a clip 525 to a fuel flow inlet open to the upper end of the fuel injection valve F/I. The other end of the rubber hose 524 is connected to a fuel supply port 513a of a fuel pressure regulator 513 mounted on the outer wall of the intake manifold. The forward end of the horn of the fuel injection valve F/I is projected into the intake manifold from the lower opening of the housing 506. The space between the opening and the outer peripheral part of the horn is sealed by a seal ring 526.

The lower inner space of the housing 506 is isolated from the intake air path of the intake manifold by means of the seal ring 526 and the elastic ring 521.

The internal space thus isolated communicates with the fuel path upstream of the ball valve in the horn by a through hole formed in the horn.

Numeral 512 designates a fuel return pipe which connects the internal space of the housing 506 and an external fuel path not shown in the drawing.

The injection body 507 configured this way is coupled with a throttle body 510 through a gasket made of an insulating material.

Numeral 509 designates a throttle valve providing an air control valve mounted inside of the throttle body 510. The throttle body 510 is connected through the intake manifold 515 to the engine 516.

The fuel is introduced from a fuel inlet port 513b of the fuel pressure regulator 513 to a rubber pipe 524 through a fuel supply port 513a, and is further supplied into a fuel conduction tube inserted into the central part of the injection valve. Numeral 513c designates a fuel return pipe of the fuel pressure regulator.

To the extent that the ball valve is closed, the fuel overflows into the space in the housing isolated from outside. The fuel that has stayed in this space is returned to the external fuel path through a return pipe 512.

When the ball valve rises from the valve seat due to the resonance of the horn, the fuel is supplied to the vibration surface at the forward end of the horn by way of a guide path.

The fuel in mist form atomized by the ultrasonic vibration of the vibration surface is mixed with the air flowing in the intake manifold, and supplied to the engine through the path around the throttle valve.

The fuel may flow in reverse direction in FIG. 37. More specifically, the fuel supply port 513a of the fuel pressure regulator may be connected to the pipe 512 and led to the isolated space in the housing, the through hole 523, the fuel conduction tube of the injection valve and the rubber pipe 524. In this case, the advantage is that the fuel air bubbles generated in the space accomodating the ball valve, etc. is capable of being discharged rapidly through the fuel path.

The fuel return path is not necessarily required. In such a case, the return pipe 512, the seal ring 526 and the through hole 523 shown in FIG. 37 may be eliminated.

As another alternative form, the fuel conduction tube inserted in the central part of the injection valve may be constructed in a double-pipe structure including a fuel supply pipe and a discharge pipe.

According to still another alternative form, the fuel conduction tube in the central part of the injection valve made be constructed of a solid rod member, the horn part corresponding to the space accomodating the ball valve is formed with a through hole (substantially identical to the through hole shown in FIG. 37) for external communication, and the fuel from the fuel pressure regulator is directly supplied to the isolated space of the housing 506 as shown by the dashed line in FIG. 37 and therefrom into the ball valve-accomodating space through the through hole 523.

The injection valve is not limited to the straight type shown in FIG. 37, but may take any of the forms described above.

The single-point injection system of the type used for injection upstream of the throttle type, in particular, may be preferably constructed with an injection valve having a convex spherical vibration or a flat vibration surface with a large fuel spread angle therefrom.

The parabolic type of injection valve, on the other hand, in which the fuel mist is converged, is effectively used with a system with the fuel injected toward the intake valve of the engine.

Further, if the ratio of the length of the fuel guide path downstream of the ball valve to the ball diameter is set to 1.5 to 2.0 or more, a liquid film providing a sufficient wavy flow is formed on the inner wall of the fuel path or on the vibration surface, so that the fuel directly injected from the injection port is reduced for accurate supply to the vibration surface.

The embodiment under consideration comprises a horn-mounting bracket constructed to form a vibration node as an origin from which the amplitude is progressively increased toward the forward end of the horn.

As a result, the fuel flowing in the fuel path in the horn is higher in speed than when it would flow only under the pressure difference free of vibration. This is considered due to the probable fact that the adherence between the internal wall surface of the path and the fuel is reduced by the vibration.

If this property is utilized, the time of transporting the fuel from the inlet of the fuel path of the horn to the outlet thereof is shortened, with the result that the time lag between the measurement and the injection into the intake manifold is minimized.

This advantage is not confined to the construction of the aforementioned embodiment with a metering valve formed midway of the fuel path but applicable also to a fuel supply system configured in such a manner that the fuel metered outside of the horn is charged by way of the inlet of the horn.

What is claimed is:

1. A fuel injection valve for internal combustion engines, comprising:

a horn having a fuel path extending therethrough;

an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;

a fuel metering unit located on said fuel path within said horn for metering fuel on said fuel path, including a valve member in the form of a ball biased into pressure contact with a valve seat, said valve member being responsive to mechanical vibration at a predetermined level of amplitude for moving away from said valve seat to meter fuel through said fuel path; and atomizing means in the form of a vibration surface mounted on said horn at the outlet of said fuel path downstream from said fuel metering unit for atomizing fuel metered by said fuel metering unit and flowing onto said vibration surface from the outlet of said fuel path, wherein the length of said fuel path between said valve seat and said vibration surface is at least 1.5 times the diameter of said ball.

2. A fuel injection valve according to claim 1, wherein said fuel path has a length of between 1.5 and 2.0 times the diameter of said ball.

3. A fuel supply system for an internal combustion engine, comprising:

a horn having a fuel path extending therethrough;

an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;

a fuel metering unit located on said fuel path within said horn for metering fuel on said fuel path, including a valve member biased into pressure contact with a valve seat, said valve member being responsive to mechanical vibration at a predetermined level of amplitude for moving away from said valve seat to meter fuel through said fuel path;

atomizing means in the form of a vibration surface mounted on said horn at the outlet of said fuel path downstream from said fuel metering unit for atomizing fuel metered by said fuel metering unit and flowing onto said vibration surface from the outlet of said fuel path; and means for generating said electrical signal at a predetermined frequency and for continuously applying said electrical signal to said electrostrictive device.

4. A fuel supply system according to claim 3, wherein said electrostrictive device includes a plurality electrostrictive elements and at least one of said electrostrictive elements is a monitor electrostrictive element operating as means for detecting the frequency of said mechanical vibration of said horn, and further including means responsive to a signal from said monitor electrostrictive element for controlling said electrical signal generating means to set the frequency of said electrical signal so that said mechanical vibration will have a frequency corresponding to the resonant frequency of said horn.

5. A fuel supply system for internal combustion engines, comprising:

a horn mounted on the intake manifold and adapted to be displaced by being driven by a piezoelectric device;

a fuel supply path formed in the horn and having an injection port at the end thereof in the intake manifold;

a valve member disposed at the injection port; and drive signal supply means for supplying the piezoelectric device with a first pulse drive signal of a first amplitude at a frequency lower than the resonant frequency of the horn and a second pulse drive signal of a second amplitude larger than the first amplitude at the resonant frequency of the horn, the second pulse drive signal being inserted into the first pulse drive signal.

6. A fuel supply system for an internal combustion engine, comprising:

a horn having a fuel path extending therethrough;

an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;

a fuel metering unit located on said fuel path within said horn for metering fuel on said fuel path, including a valve member biased into pressure contact with a valve seat, said valve member being responsive to mechanical vibration at a predetermined level of amplitude for moving away from said valve seat to meter fuel through said fuel path;

atomizing means in the form of a vibration surface mounted on said horn at the outlet of said fuel path downstream from said fuel metering unit for atomizing fuel metered by said fuel metering unit and flowing onto said vibration surface from the outlet of said fuel path; and drive signal supply means for supplying to said electrostrictive device a first pulse drive signal of a first amplitude at a frequency lower than the resonant frequency of the horn and a second pulse drive signal at a second amplitude larger than the first amplitude at the resonant frequency of the horn, said second pulse drive signal being selectively inserted into the first pulse drive signal to cause said valve member to move away from said valve seat.

7. A fuel supply system for an internal combustion engine, comprising:
   a horn having a fuel path extending therethrough;
   an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;
   a fuel metering unit located on said fuel path within said horn for metering fuel on said fuel path, including a valve member biased into pressure contact with a valve seat, said valve member being responsive to mechanical vibration at a predetermined level of amplitude for moving away from said valve seat to meter fuel through said fuel path; and
   drive signal supply means for supplying to said electrostrictive device a first pulse drive signal of a first amplitude at a frequency lower than the resonant frequency of the horn and a second pulse drive signal of a second amplitude larger than the first amplitude at the resonant frequency of the horn, said second pulse drive signal being selectively inserted into the first pulse drive signal to cause said valve member to move away from said valve said.

8. A fuel supply system for an internal combustion engine, comprising:
   a horn having a fuel path extending therethrough;
   an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;
   a fuel metering unit located on said fuel path within said horn for metering fuel on said fuel path, including a valve member biased into pressure contact with a valve seat, said valve member being responsive to mechanical vibration at a predetermined level of amplitude for moving away from said valve seat to meter fuel through said fuel path;
   atomizing means in the form of a vibration surface mounted on said horn at the outlet of said fuel path downstream from said fuel metering unit for atomizing fuel metered by said fuel metering unit and flowing onto said vibration surface from the outlet of said fuel path; and
   drive signal supply means for supplying to said electrostrictive device a first pulse drive signal of a first amplitude at a frequency lower than the resonant frequency of the horn and a second pulse drive signal at said first amplitude and at the resonant frequency of the horn, said second pulse drive signal being selectively inserted into the first pulse drive signal to cause said valve member to move away from said valve seat.

9. A fuel supply system for an internal combustion engine, comprising:
   a horn having a fuel path extending therethrough;
   an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;
   a fuel metering unit located on said fuel path within said horn for metering fuel on said fuel path, including a valve member biased into pressure contact with a valve seat, said valve member being responsive to mechanical vibration at a predetermined level of amplitude for moving away from said valve seat to meter fuel through said fuel path;
   atomizing means in the form of a vibration surface mounted on said horn at the outlet of said fuel path downstream from said fuel metering unit for atomizing fuel metered by said fuel metering unit and flowing onto said vibration surface from the outlet of said fuel path; and
   drive signal supply means for supplying to said electrostrictive device a first pulse drive signal of a first amplitude above zero and a second pulse drive signal of a second amplitude larger than said first amplitude and at the resonant frequency of the horn, said second pulse drive signal being selectively inserted into the first pulse drive signal to cause said valve member to move away from said valve seat.

10. A fuel supply system for an internal combustion engine, comprising:
    a horn mounted on an intake manifold of the internal combustion engine and having a fuel supply path formed therein which extends from a fuel inlet to a fuel outlet port at the end thereof in the intake manifold;
    means including a fuel pressure regulator for supplying fuel to the fuel inlet of said fuel supply path;
    an electrostrictive device mounted on said horn and responsive to an electrical signal at a predetermined frequency for subjecting said horn to a mechanical vibration at the resonant frequency of said horn, whereby said mechanical vibration is amplified at an end of said horn where an outlet of said fuel path is located;
    a fuel metering unit located on said fuel path within said horn for metering fuel on said fuel path, including a valve member biased into pressure contact with a valve seat, said valve member being responsive to mechanical vibration at a predetermined level of amplitude for moving away from said valve seat to meter fuel through said fuel path;
    atomizing means in the form of a vibration surface mounted on said horn at the outlet of said fuel path downstream from said fuel metering unit for atomizing fuel metered by said fuel metering unit and flowing onto said vibration surface from the outlet of said fuel path; and
    means for generating said electrical signal at said predetermined frequency and for continuously applying said electrical signal to said electrostrictive device while controlling the amplitude thereof to selectively operate said fuel metering unit.

11. A fuel supply system according to claim 10, wherein said intake manifold of the internal combustion engine has a throttle valve mounted therein to control suction air supplied through said intake manifold, and wherein said horn is mounted in said intake manifold downstream of said throttle valve.

12. A fuel supply system according to claim 10, wherein said intake manifold of the internal combustion engine has a throttle valve mounted therein to control suction air supplied through said intake manifold, and wherein said horn is mounted in said intake manifold upstream of said throttle valve.

13. A fuel supply system according to claim 10, wherein said horn includes a flange for mounting said horn on said intake manifold, said flange being located at a node of the mechanical vibration to which said horn is subjected by said electrostrictive device and from which said vibration increases progressively toward the end of said horn carrying said atomizing means.

14. A fuel supply system according to claim 10, wherein the length of said fuel path between said valve seat and said vibration surface is at least 10 mm.

15. A fuel supply system according to claim 10, wherein said valve member is a ball, and the length of said fuel path between said valve seat and said vibration surface is at least 1.5 times the diameter of said ball.

* * * * *